(12) United States Patent
Shen et al.

(10) Patent No.: US 11,421,986 B2
(45) Date of Patent: Aug. 23, 2022

(54) METHOD, APPARATUS, SYSTEM AND SENSOR FOR DETECTING MULTI-MODE ELECTROMAGNETIC ACOUSTIC AND MAGNETIC FLUX LEAKAGE

(71) Applicants: China Special Equipment Inspection Group Co., Ltd., Beijing (CN); CHINA SPECIAL EQUIPMENT INSPECTION AND RESEARCH INSTITUTE, Beijing (CN)

(72) Inventors: Gongtian Shen, Beijing (CN); Yang Zheng, Beijing (CN); Zongjian Zhang, Beijing (CN); Jidong Tan, Beijing (CN); Sujun Li, Beijing (CN)

(73) Assignees: China Special Equipment Inspection Group Co., Ltd., Beijing (CN); CHINA SPECIAL EQUIPMENT INSPECTION AND RESEARCH INSTITUTE, Beijing (CN)

( * ) Notice: Subject to any disclaimer, the term of this patent is extended or adjusted under 35 U.S.C. 154(b) by 371 days.

(21) Appl. No.: 16/478,858

(22) PCT Filed: Mar. 6, 2017

(86) PCT No.: PCT/CN2017/075750
§ 371 (c)(1),
(2) Date: Jul. 18, 2019

(87) PCT Pub. No.: WO2018/133179
PCT Pub. Date: Jul. 26, 2018

(65) Prior Publication Data
US 2019/0376785 A1 Dec. 12, 2019

(30) Foreign Application Priority Data
Jan. 18, 2017 (CN) .......................... 201710039761.1

(51) Int. Cl.
*G01N 27/83* (2006.01)
*G01N 29/34* (2006.01)
(Continued)

(52) U.S. Cl.
CPC ............... *G01B 17/02* (2013.01); *G01B 7/10* (2013.01); *G01N 27/83* (2013.01);
(Continued)

(58) Field of Classification Search
CPC .......... G01B 17/02; G01B 7/10; G01N 27/83; G01N 27/9006; G01N 29/041;
(Continued)

(56) References Cited

U.S. PATENT DOCUMENTS

| | | | |
|---|---|---|---|
| 5,808,202 A | 9/1998 | Passarelli, Jr. | |
| 6,932,382 B2 * | 8/2005 | Hayes | B60R 21/01516 177/210 EM |

(Continued)

FOREIGN PATENT DOCUMENTS

| | | |
|---|---|---|
| CN | 101354380 A | 1/2009 |
| CN | 101358948 A | 2/2009 |

(Continued)

*Primary Examiner* — Suman K Nath
(74) *Attorney, Agent, or Firm* — Gang Yu

(57) ABSTRACT

The disclosure discloses a method, apparatus and system for detecting multi-mode electromagnetic acoustic and magnetic flux leakage and a sensor. The method comprises: S102, receiving an operation instruction for detecting an object to be detected, the operation instruction is used for controlling a detection sensor to enter into any one or more of working modes as follows: magnetic flux leakage detection, ultrasonic bulk wave detection, ultrasonic guided wave detection and surface wave detection; S104, controlling the detection sensor to output a corresponding detection signal according to the operation instruction; and S106, detecting the object to be detected on the basis of the detection signal.

(Continued)

The technical solution achieves a purpose of using one sensor to realize various detection modes, such as magnetic flux leakage and electromagnetic acoustic modes, reduces complexity and cost of a detection system, and improves detection efficiency.

18 Claims, 10 Drawing Sheets

(51) Int. Cl.
      *G01B 17/02*     (2006.01)
      *G01B 7/06*     (2006.01)
      *G01N 27/90*     (2021.01)
      *G01N 29/04*     (2006.01)

(52) U.S. Cl.
      CPC ....... *G01N 27/9006* (2013.01); *G01N 29/041* (2013.01); *G01N 29/048* (2013.01); *G01N 29/348* (2013.01); *G01N 2291/0234* (2013.01); *G01N 2291/0289* (2013.01); *G01N 2291/02854* (2013.01)

(58) Field of Classification Search
      CPC .... G01N 29/048; G01N 29/348; G01N 29/42; G01N 29/225; G01N 29/043; G01N 29/2412; G01N 29/04; G01N 29/07; G01N 2291/0234; G01N 2291/02854; G01N 2291/0289; G01N 2291/0422; G01N 2291/0426; G01N 2291/0423; G01N 2291/044; G01N 2291/023; G01N 2291/011; G01N 2291/2695; G01S 15/08
See application file for complete search history.

(56) References Cited

U.S. PATENT DOCUMENTS

2010/0314961 A1*  12/2010  An .................. H02K 21/20
                                          310/155
2012/0091829 A1*  4/2012  Choi ................. B06B 1/08
                                            310/26

FOREIGN PATENT DOCUMENTS

| CN | 103353478 A | 10/2013 |
| CN | 103353479 A | 10/2013 |
| CN | 206489114 U | 9/2017 |

* cited by examiner

METHOD, APPARATUS, SYSTEM AND SENSOR FOR DETECTING MULTI-MODE ELECTROMAGNETIC ACOUSTIC AND MAGNETIC FLUX LEAKAGE

TECHNICAL FIELD

The disclosure relates to the technical field of industrial non-destructive testing, and in particular to a method, apparatus, system and sensor for detecting multi-mode electromagnetic acoustic and magnetic flux leakage.

BACKGROUND

In the field, non-destructive testing is an indispensable part of industrial development. Non-destructive testing can detect defects or inhomogeneities on the surface or inside of the object to be tested without damaging or affecting the performance of the object to be tested.

Generally, in a non-destructive testing process, a magnetic flux leakage detection technique and an electromagnetic acoustic detection technique (including: ultrasonic bulk wave detection, ultrasonic guided wave detection and surface wave detection) are mainly adopted; herein, for the magnetic flux leakage detection technique, corrosion detection on an ferromagnetic material (such as a steel plate or a pipeline) may be carried out by using the magnetic flux leakage detection technique; non-destructive testing on the object to be detected is carried out by using the electromagnetic acoustic detection technique by generating an ultrasonic bulk wave, a surface wave and an ultrasonic guided wave; It has many advantages such as no need to polish the surface of the material, no coupling agent, non-contact detection, etc., and is especially suitable for automated ultrasonic testing equipment.

However, since non-destructive testing in actual engineering is always based on multiple detection target tasks, multiple defects of the object to be detected need to be detected, defect information needs to be obtained as much as possible, and rapidness and high efficiency are also required. For example, when a wall plate and a bottom plate of a large-size storage tank are detected, not only is a thickness tested to achieve corrosion detection, but also cracks are detected, meanwhile, whether a defect is on an inner side or an outer side of the object to be detected is also expected to be distinguished, and in addition, an efficient detection strategy that a defect area position is rapidly scanned and the detect is precisely detected is also expected. In order to achieve the above detection targets, multiple detection techniques such as magnetic flux leakage, ultrasonic bulk wave, surface wave and ultrasonic guided wave need to be used together generally.

Traditionally, sensors for detection on magnetic flux leakage, ultrasonic bulk wave, surface wave, ultrasonic guided wave and the like are all independent sensors, to achieve the above detection targets, multiple instruments and sensors for the magnetic flux leakage, the ultrasonic bulk wave, the surface wave and the ultrasonic guided wave need to be combined and used together to implement detection, for example, when the wall plate and the bottom plate of the large-size storage tank are detected, firstly, a defect area is positioned by taking the advantage of large-scale detection of the ultrasonic guided wave, later a robot crawls into the defect area to carry out precise thickness measurement, defect corrosion imaging is realized through C scanning, and furthermore the surface wave detection technique is carried out to distinguish whether corrosion is on an inner surface or an outer surface. Therefore, in tradition, a scheme that the object to be detected is detected by using multiple independent sensors increases complexity and cost of a detection system, and detection efficiency is not high.

An effective solving scheme for problems that in the conventional art the detection system is high in complicity and low in working efficiency when corrosion, surface cracks and internal damage of a ferromagnetic metallic material are detected by using multiple independent sensors is not available yet at present.

SUMMARY embodiments of the disclosure provides a method, apparatus, system and sensor for detecting multi-mode electromagnetic acoustic and magnetic flux leakage, and aims to solve technical problems that in the conventional technical field incomprehensive detection and low working efficiency are caused since comprehensive detection with ultrasonic bulk wave, ultrasonic guided wave, surface wave and magnetic flux leakage cannot be realized for a detected material.

According to one aspect of the embodiment of the disclosure, a method for detecting multi-mode electromagnetic acoustic and magnetic flux leakage is provided, including: receiving an operation instruction for detecting an object to be detected, the operation instruction is used for controlling a detection sensor to enter into any one or more of working modes as follows: magnetic flux leakage detection, ultrasonic bulk wave detection, ultrasonic guided wave detection and surface wave detection; controlling the detection sensor to output a corresponding detection signal according to the operation instruction; detecting the object to be detected on the basis of the detection signal.

According to another aspect of the embodiment of the disclosure, a multi-mode electromagnetic acoustic and magnetic flux leakage detection sensor is further provided, including, a U-shaped magnetic yoke, configured to magnetize a material of an object to be detected, and generating a magnetic field signal in the object to be detected; a magnetic flux leakage receiving component, positioned in the middle of the U-shaped magnetic yoke, and used for detecting whether a leakage magnetic field signal exists outside the object to be detected or not; a first electromagnetic acoustic coil, positioned below a pole N of the U-shaped magnetic yoke, combined and used with a lower end of the pole N of the U-shaped magnetic yoke, and used for generating or receiving any one or more of multiple detection waves as follows: an ultrasonic bulk wave, an ultrasonic guided wave and a surface wave.

According to another aspect of the embodiment of the disclosure, a system for detecting multi-mode electromagnetic acoustic and magnetic flux leakage is provided, including: the sensors of any one of the above aspects.

According to another aspect of the embodiment of the disclosure, a device for detecting multi-mode electromagnetic acoustic and magnetic flux leakage is provided, including: a receiving module, for receiving an operation instruction for detecting an object to be detected, and the operation instruction is used for controlling a detection sensor to enter into any one or more of working modes as follows: magnetic flux leakage detection, ultrasonic bulk wave detection, ultrasonic guided wave detection and surface wave detection; a control module, used for controlling the detection sensor to output a corresponding detection signal according to the operation instruction; a detection module, used for detecting the object to be detected on the basis of the detection signal.

BRIEF DESCRIPTION OF THE DRAWINGS

The drawings described herein are intended to provide a further understanding of the invention, and are intended to be a part of the invention. The illustrative embodiments of the present invention and the description thereof are intended to explain the present invention and are not intended to limit the invention. In the drawings.

Figure 1:
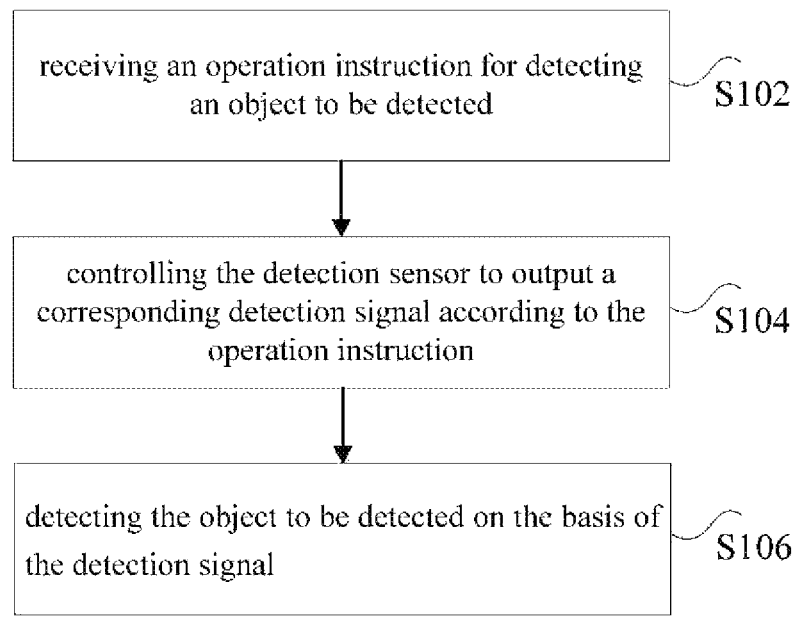
FIG. 1 shows a flow chart of a method for detecting multi-mode electromagnetic acoustic and magnetic flux leakage according to embodiments of the disclosure.

Herein, the drawings include the following drawing markers:

201, object to be detected; 203, U-shaped magnetic yoke; 205, magnetic sensitive element (magnetic flux leakage receiving component); 207, first electromagnetic acoustic coil; 209, second electromagnetic acoustic coil; 10, magnetizing zone; 20, transverse wave; 30, guided wave; 40, surface wave; 60, eddy (eddy field); 1, in-body defect; 2, surface layer defect; 11, signal generator; 12, power amplifier; 13, duplexer; 14, electromagnetic acoustic signal conditioning unit; 15; magnetic flux leakage signal conditioning unit; 16; electromagnetic acoustic guided wave signal conditioning unit; 17, multi-channel signal acquirer: 18, host computer; 05, U-shaped magnetic yoke; 02, excitation coil; 08, receiving coil; 01, magnetic flux leakage receiving component (magnetic sensitive element); 06, magnetic flux leakage receiving, component mounting base: 03, roller; 04, shell: 07, wiring base.

DETAILED DESCRIPTION OF THE EMBODIMENTS

In order to make technicians in the technical field understand the disclosure clearly, the technical solution of the embodiments of the disclosure will be clearly and completely described below in combination with the drawings and the embodiments of the disclosure. Apparently, the described embodiments are merely a part of the embodiments of the disclosure, not all of the embodiments. On the basis of the embodiments of the disclosure, all other embodiments obtained on the premise of no creative work of those skilled in the technical field fall within the protection scope of the disclosure.

It should be noted that the specification and claims of the disclosure and terms "first" "second", etc. in the foregoing drawings are used for distinguishing similar objects rather than describing a specific sequence or a precedence order. It will be appreciated that the terms used in such a way may be exchanged under appropriate conditions, in order that the embodiments of the disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Embodiment 1

According to the embodiment, an embodiment of a method for detecting multi-mode electromagnetic acoustic and magnetic flux leakage is provided, it needs to explain that steps illustrated in the flow charts of the drawings may be executed in computer systems with a group of computer executable instructions, in addition, although logic sequences are illustrated in the flow charts, under some situations, the illustrated or described steps may be executed in different sequences.

FIG. 1 shows a flow chart of the method for detecting multi-mode electromagnetic acoustic and magnetic flux leakage according to the embodiment of the disclosure, as shown in the figure, the method includes the following steps:

S102, receiving an operation instruction for detecting an object to be detected, herein, the operation instruction is used for controlling a detection sensor to enter into any one or more of working modes as follows: magnetic flux leakage detection, ultrasonic bulk wave detection, ultrasonic guided wave detection and surface wave detection.

Specifically, in the above step, the object to be detected may be any component which is to be detected and is made of a ferromagnetic conductor material, such as a steel plate, a storage tank, a pipeline, etc.; the detection sensor may be an sensor for magnetic flux leakage detection, ultrasonic bulk wave detection, ultrasonic guided wave detection and surface wave detection.

In an optional embodiment, the detection sensor may be a sensor consisting of a magnetic yoke, a magnetic flux leakage receiving component (such as a magnetic sensitive element) and at least one electromagnetic acoustic coil; herein, the magnetic yoke may be any one of components as follows: a permanent magnet or an electromagnet, for generating an excitation magnetic field for magnetic flux leakage detection and a bias magnetic field for electromagnetic acoustic detection.

It needs to be noted that if the magnetic yoke is the permanent magnet, the magnetic yoke may be used for providing a lasting magnetic field; if the magnetic yoke is the electromagnet (may be a magnetic yoke wound by a coil), a magnetic field needs to be generated in a direct current power on/off mode.

Optionally, the magnetic yoke takes a shape of U or a horseshoe, and the U-shaped magnetic yoke in the embodiment is taken as an example for description.

On the basis of the above embodiment, as an optional implementation mode, the U-shaped magnetic yoke and the magnetic element form a magnetic flux leakage detection sensor for magnetic flux leakage detection, the U-shaped magnetic yoke is adopted as an excitation device, the magnetic sensitive element is adopted as a magnetic field detector, and a ferromagnetic material is magnetized through the alternative current type or permanent magnetic type U-shaped magnetic yoke; if the material has a defect on a surface or a subsurface, a magnetic induction line in the material is distorted, a magnetic flux leakage field is generated on a material surface above the defect, and detection on the surface of the ferromagnetic material or a surface defect is achieved by detecting the magnetic flux leakage field by using the magnetic field detector. The mode has great application prospects in aspects such as storage tank bottom plate detection and detection in pipelines.

Still on the basis of the embodiment, as another optional implementation mode, the lower end of the pole N or the pole S of the U-shaped magnetic yoke and the electromagnetic acoustic coil form an electromagnetic acoustic detection sensor for electromagnetic acoustic detection, an ultrasonic bulk wave, a surface wave and an ultrasonic guided wave are generated for non-destructive testing, and the mode has multiple advantages of no material surface polishing, no coupling agent, non-contact detection, etc., and is particularly applicable to automatic ultrasonic detection apparatuses. The ultrasonic bulk wave is generally applied to pulse echo type thickness measurement or flaw detection (is a point detection technique); the surface wave is generally applied to detection on defects on a surface of a structure; the ultrasonic guided wave is generally applied to detection on a defect of a thin-wall structure (is a surface detection technique). At present, a robot with an electromagnetic acoustic direct incidence sensor for pulse echo thickness measurement is available and is generally applied to large-size steel structure wall thickness measurement and corrosion detection. Compared with a piezoelectric ultrasonic detection robot, the electromagnetic acoustic detection robot needs no polishing mechanism or water ejection coupling mechanism, so that machine mechanism components, control modules, spaces, weights, cables and the like are reduced, and great advantages are achieved.

S104, controlling the detection sensor to output a corresponding detection signal according to the operation instruction.

Specifically, in the above step, after receiving the operation instruction input by a user to detect the object to be detected, controlling the detection sensor to enter into different working modes, and outputting a detection signal for detecting the object to be detected in the mode; herein, the detection signal may be a magnetic field signal detected by the magnetic sensitive element in the magnetic flux leakage detection mode, or may be the ultrasonic bulk wave, the ultrasonic guided wave or the surface wave in the electromagnetic acoustic detection mode.

S106, detecting the object to be detected on the basis of the detection signal.

Specifically, in the above step, after generating at least one detection signal for detecting the object to be detected through the detection sensor, detecting the object to be detected on the basis of the detection signal.

From the foregoing, in the embodiment of the disclosure, by using the multi-mode electromagnetic acoustic and magnetic flux leakage integral sensor composed of the U-shaped magnetic yoke, the electromagnetic acoustic coil and the magnetic sensitive element, receiving, by a host computer, the operation instruction which is input by the user and is used for detecting the object to be detected, controlling the detection sensor to enter into any one or more working modes according to the operation instruction, outputting the detection signal corresponding to the working mode, and finally detecting the object to be detected according to the detection signal, a purpose that multiple detection modes such as magnetic flux leakage detection and electromagnetic acoustic detection are realized by using one sensor is achieved, technical effects that complexity and cost of a detection system are reduced and detection efficiency is improved are achieved, and furthermore technical problems that in the conventional technical field incomprehensive detection and low working efficiency are caused since comprehensive detection of ultrasonic bulk wave, ultrasonic guided wave, surface wave and magnetic flux leakage of a detected material cannot be achieved are solved.

As a preferable embodiment, the detection sensor at least includes: a magnetic yoke, a magnetic flux leakage receiving component, a first electromagnetic acoustic coil below a pole N of the magnetic yoke and a second electromagnetic acoustic coil below a pole S of the magnetic yoke, herein, the magnetic yoke is any one of components as follows: a permanent magnet or an electromagnet, for generating an excitation magnetic field for magnetic flux leakage detection and a bias magnetic field for electromagnetic acoustic detection. Preferably, the magnetic yoke is a U-shaped magnetic yoke.

Figure 2:
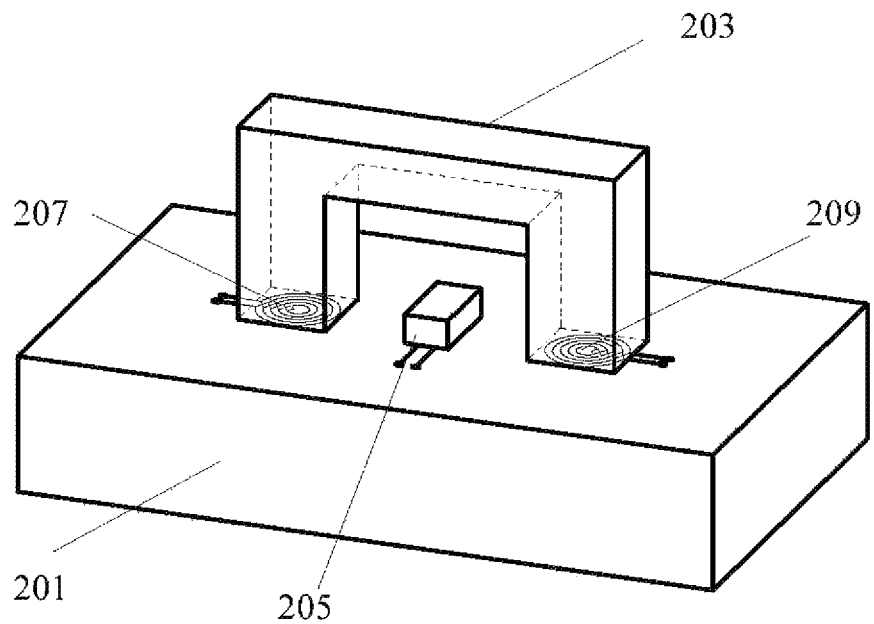
FIG. 2 shows a schematic diagram of an optional multi-mode electromagnetic acoustic and magnetic flux leakage integral sensor according to embodiments of the disclosure.

Preferably, on the basis of the embodiment, FIG. 2 shows a schematic diagram of an optional multi-mode electromagnetic acoustic and magnetic flux leakage integral sensor according to the embodiment of the disclosure; as shown in FIG. 2, the sensor may include: a U-shaped magnetic yoke 203, a magnetic sensitive element (magnetic flux leakage receiving component) 205, a first electromagnetic acoustic coil 207 and a second electromagnetic acoustic coil 209, Herein, the drawing marker 201 illustrates an object to be detected; the U-shaped magnetic yoke 203 may be a permanent magnetic yoke or an electromagnet body yoke for generating a magnetic flux leakage detection excitation magnetic field and a bias magnetic field of an electromagnetic acoustic sensor; the first electromagnetic acoustic coil 207 (annular coil) and the second electromagnetic acoustic coil 209 (annular coil) are arranged below two poles of the U-shaped magnetic yoke 203, herein, the first electromagnetic acoustic coil 207 is positioned below the pole N of the U-shaped magnetic yoke, and the second electromagnetic acoustic coil 209 is positioned below the pole S of the U-shaped magnetic yoke; the bias magnetic field is provided by using the U-shaped magnetic yoke 203; in case of different excitation frequencies, the first electromagnetic acoustic coil 207 and the second electromagnetic acoustic coil 209 can be adopted to excite and receive ultrasonic bulk wave, surface wave and ultrasonic guided wave; the magnetic sensitive element 205 is arranged in the middle of the U-shaped magnetic yoke, is capable of measuring a magnitude and a direction of a magnetic field and is used for acquiring a magnetic flux leakage detection signal.

It needs to be noted that the sensor is capable of realizing detection functions as follows: a magnetic flux leakage detection function, an ultrasonic bulk wave thickness measurement and direct incidence flaw detection function, a guided wave detection function and a surface wave detection function.

Figure 3:
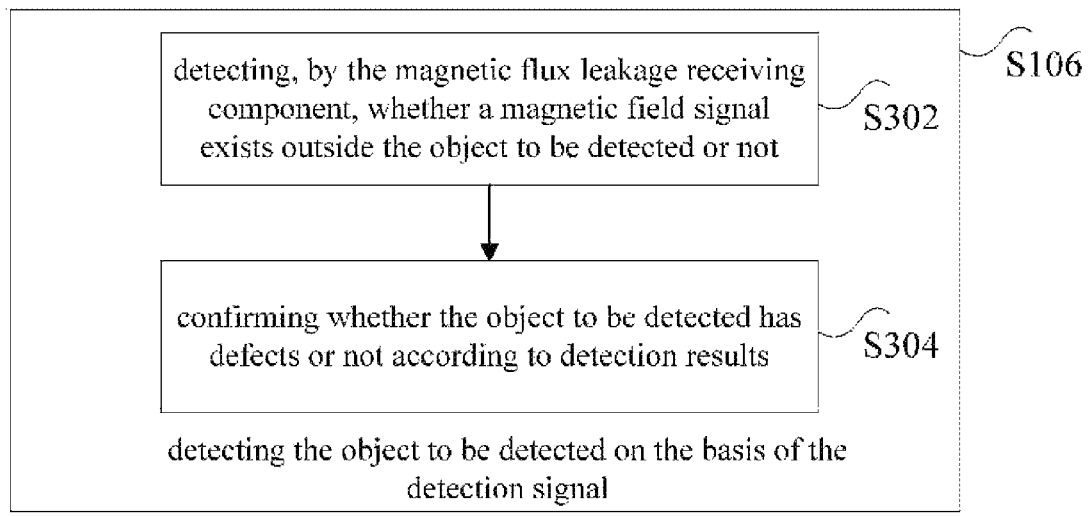
FIG. 3 shows a flow chart of an optional method for detecting multi-mode electromagnetic acoustic and magnetic flux leakage according to embodiments of the disclosure.

As an optional embodiment, under a condition of a working mode as magnetic flux leakage detection, generating, by the detection sensor, a magnetic field signal in the object to be detected through the magnetic yoke (such as the U-shaped magnetic yoke); as shown in FIG. 3, detecting the object to be detected on the basis of the detection signal in the step S106, including:

S302, detecting, by the magnetic flux leakage receiving component, whether a magnetic field signal exists outside the object to be detected or not, herein, the magnetic flux leakage receiving component is positioned in the middle of the magnetic yoke;

S304, confirming whether the object to be detected has defects according to detection results.

Figure 4:
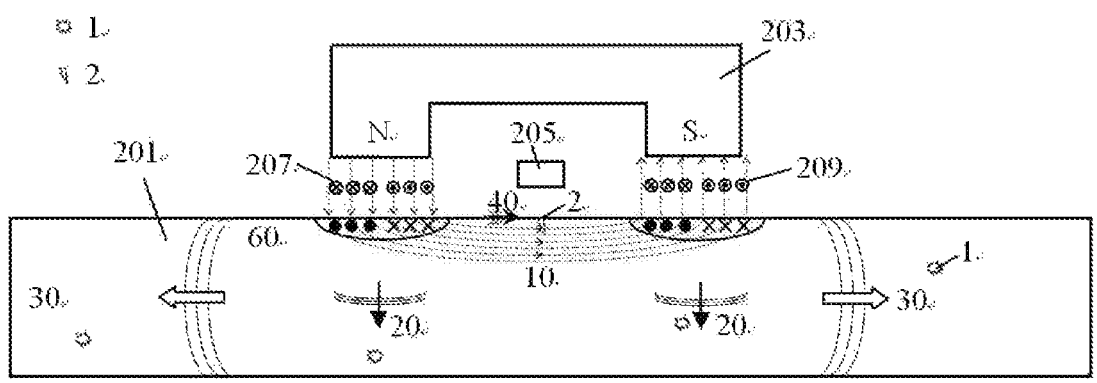
FIG. 4 shows a schematic diagram of working principles of the optional multi-mode electromagnetic acoustic and magnetic flux leakage integral sensor according to embodiments of the disclosure.

Specially, in the embodiment, the magnetic yoke and the magnetic flux leakage receiving component (magnetic sensitive element) may be combined to form a magnetic flux leakage detection working mode; FIG. 4 shows a working principle diagram of the optional electromagnetic acoustic and magnetic flux leakage integral sensor according to the embodiment of the disclosure; as shown in FIG. 4, the drawing marker 201 illustrates the object to be detected (ferromagnetic detected component), the drawing marker 203 illustrates the U-shaped magnetic yoke, and the drawing marker 205 illustrates the magnetic sensitive element; after the object to be detected (ferromagnetic detected component) is magnetized by using the U-shaped magnetic yoke 203, the magnetic signal is generated in the object to be detected to form a magnetizing zone 10; as shown in FIG. 4, the U-shaped magnetic yoke 203 and the object to be detected (ferromagnetic detected component) form a closed magnetic path, if the surface or a near surface of the detected component has defects (such as a surface layer defect illustrated by the drawing marker 2 in FIG. 3), the magnetic path is distorted, a part of a magnetic induction line enters the air, leaks outside the detected component to form a magnetic flux leakage field and is detected by using the magnetic sensitive element 205, and by analyzing the leakage magnetic field, whether the detected component has defects or not is confirmed.

By virtue of the embodiments, the magnetic flux leakage detection function on the object to be detected is realized.

Figure 5:
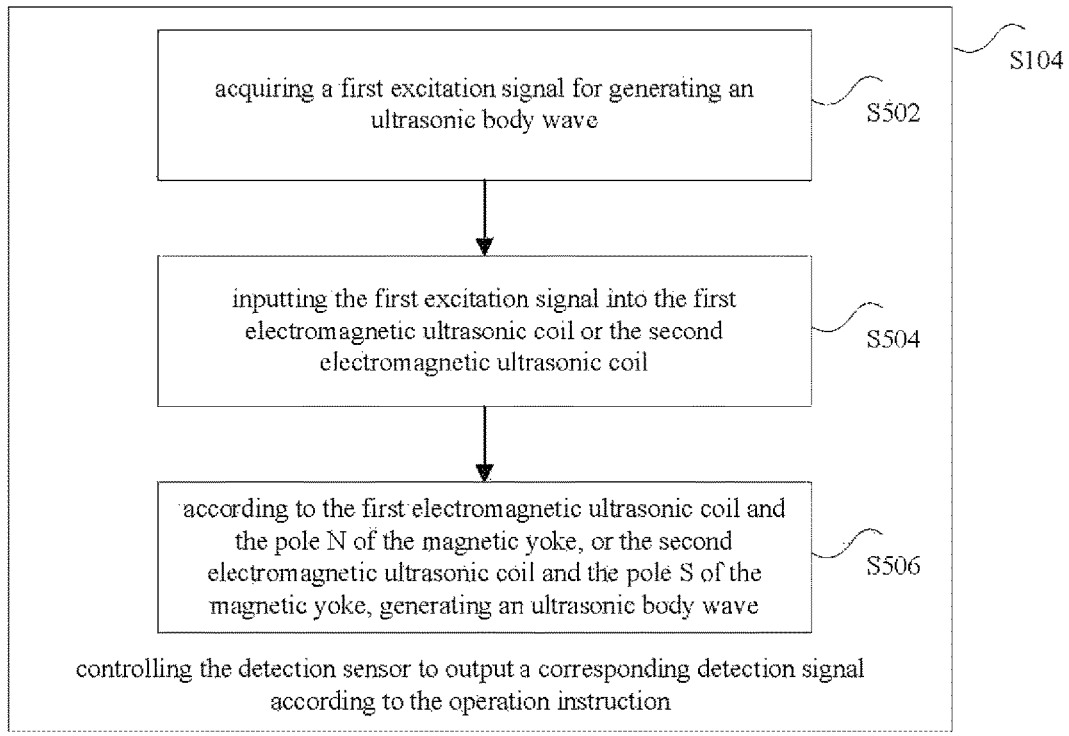
FIG. 5 shows a flow chart of an optional method for detecting multi-mode electromagnetic acoustic and magnetic flux leakage according to embodiments of the disclosure.

As an optional embodiment, under a condition of a working mode as ultrasonic body detection, as shown in FIG. 5, controlling the detection sensor to output the corresponding detection signal according to the operation instruction in the step S104, including:

S502, acquiring a first excitation signal for generating an ultrasonic bulk wave, herein, the first excitation signal has a first frequency;

S504, inputting the first excitation signal into the first electromagnetic acoustic coil or the second electromagnetic acoustic coil;

S506, According to the first combination including first electromagnetic acoustic coil and the pole N of the magnetic yoke or the second combination including the second electromagnetic acoustic coil and the pole S of the magnetic yoke, generating an ultrasonic bulk wave.

Specifically, in the above embodiment, any one end below the pole N or the pole S of the magnetic yoke (such as the U-shaped magnetic yoke) and the coil below form an electromagnetic acoustic sensor; specifically, FIG. 4 is adopted to illustrate an excitation process of ultrasonic waves: when a bulk wave response frequency signal $f_1$ is introduced into the coil (the first electromagnetic acoustic coil 207 or the second electromagnetic acoustic coil 209), generally a narrow frequency band transient state pulse signal with a central frequency less than 10 MHz, Ferromagnetic conductors induce an eddy 60 in the inspected material, and basic principles of electromagnetic induction show that an eddy field is nearly a mirror image of a spirial coil, and the eddy direction is opposite to a current direction in the coil; under the action of a vertical magnetic field provided by one magnetic pole (the pole N or the pole 5) of the U-shaped magnetic yoke, the eddy field 60 is subjected to a Lorentz force, resulting in a mass point below the coil has mechanical vibration in a frequency same as that of current in the coil. In addition, a lead of the coil also generates a dynamically changed magnetic field. At the same time, the dynamic magnetic field is able to generate a magnetizing force and a magnetostriction force in the surface of the ferromagnetic material below each line element. These forces are contribute to the mechanical vibration in a frequency same as that of current in the coil. Under coactions of the three interaction forces, an incidence transverse wave 20 is generated in the ferromagnetic guided wave material by means of coupling, and the transverse wave 20 is adopted for thickness measurement or direct incidence flaw detection on an area right below the coil.

Figure 6:
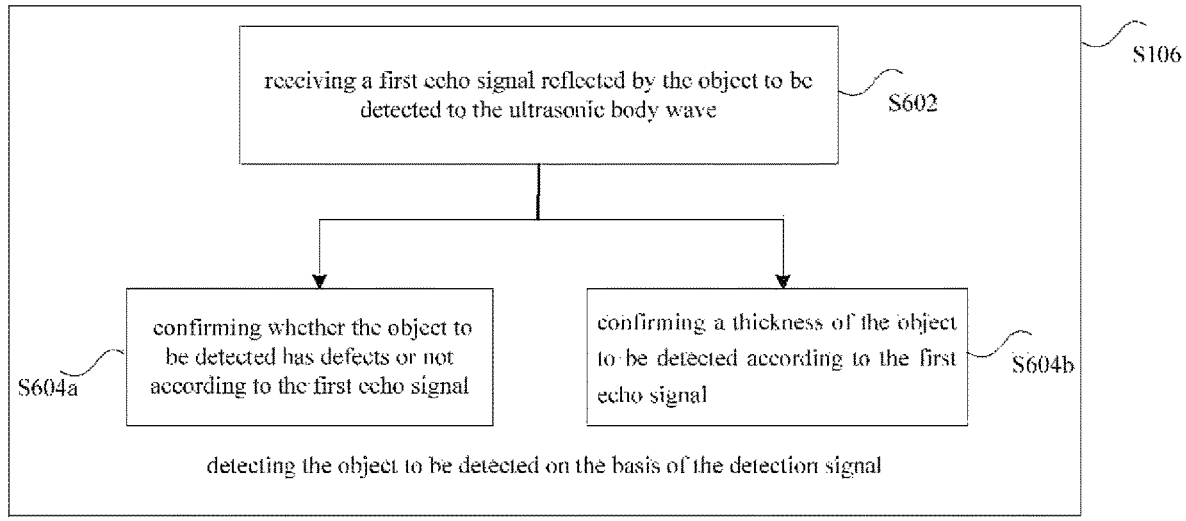
FIG. 6 shows a flow chart of the optional method for detecting multi-mode electromagnetic acoustic and magnetic flux leakage according to embodiments of the disclosure.

On the basis of the above embodiment, as shown in FIG. 6, under a condition of a working mode as ultrasonic bulk wave detection, detecting the object on the basis of the detection signal in the step S106, including:

S602 Receiving a first echo signal reflected by the object to be tested on the ultrasonic bulk wave;

S604a, confirming whether the object to be detected has defects according to the first echo signal; and/or S604b, confirming a thickness of the object to be detected according to the first echo signal.

Specifically, in the above embodiment, when encountering a bottom surface of the detected object, the ultrasonic bulk wave generates a reflection wave, when the reflection wave is conducted to a material surface, causing particle surface vibration of a material in the magnetic field to generate an electromagnetic wave radiated to an ambient space, and the electromagnetic wave is detected by the coil.

By virtue of the embodiments, ultrasonic bulk wave thickness measurement and direct incidence flaw detection functions are realized.

Figure 7:
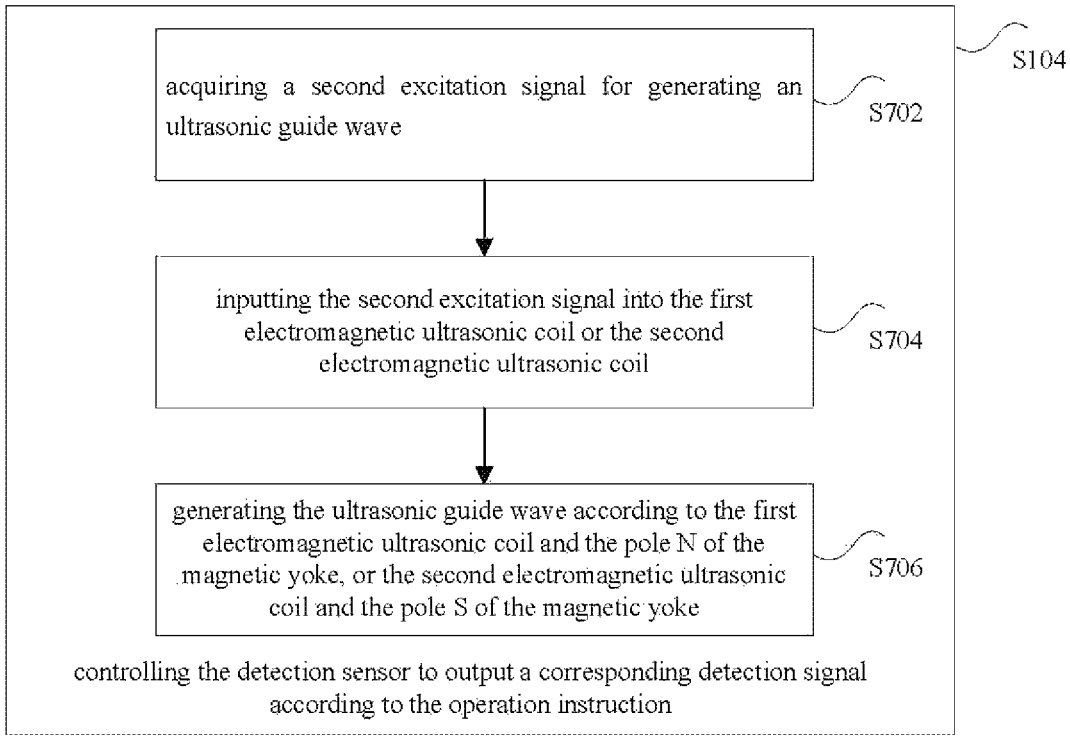
FIG. 7 shows a flow chart of the optional method for detecting multi-mode electromagnetic acoustic and magnetic flux leakage according to embodiments of the disclosure.

As an optional embodiment, under a condition of a working mode as ultrasonic guided wave detection, as shown in FIG. 7, controlling the detection sensor to output the corresponding detection signal according to the operation instruction in the step S04, including:

S702, acquiring a second excitation signal for generating an ultrasonic guided wave, herein, the second excitation signal has a second frequency;

S704, inputting the second excitation signal into the first electromagnetic acoustic coil or the second electromagnetic acoustic coil;

S706, generating the ultrasonic guided wave according to the first electromagnetic acoustic coil and the pole N of the magnetic yoke, or the second electromagnetic acoustic coil and the pole S of the magnetic yoke.

Specifically, in the above embodiment, ultrasonic guided wave detection is realized through the spiral coil sensor below one of the pole N or the pole S of the magnetic yoke (U-shaped magnetic yoke). It can be known from the working principle of the above mentioned spiral coil electromagnetic acoustic, that each coil can generate a vibration source in the annular mirror region of the surface of the ferromagnetic material. For a structure of a certain material, and a certain thickness, a single S0 modal guided wave is excited and generated at one frequency section (working frequency) of a low frequency (50 kHz-500 kHz). In one optional embodiment, as shown in FIG. 4, a generated guided wave is adopted to detect defects in a whole thickness of the detected object such as an in-body defect illustrated by the drawing marker 1 in FIG. 4. The guided wave generally has a narrow frequency band as the working frequency, and when the single S0 modal guided wave is excited and generated, a narrow frequency modulation signal is adopted as the detection signal.

Figure 8:
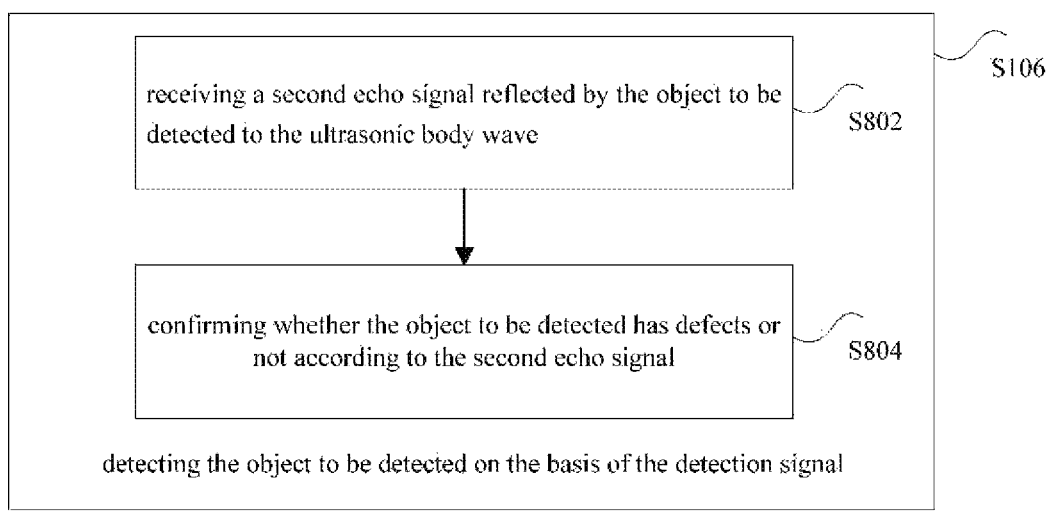
FIG. 8 shows a flow chart of the optional method for detecting multi-mode electromagnetic acoustic and magnetic flux leakage according to embodiments of the disclosure.

On the basis of the embodiment, as shown in FIG. 8, under a condition of a working mode as ultrasonic guided wave detection, detecting the tested object on the basis of the detection signal in the step S106, including:

S802, Receiving a second echo signal reflected by the tested object on the ultrasonic bulk wave S804, confirming whether the detected object has defects according to the second echo signal.

Specifically, in the above embodiment, because of symmetry of the spiral coil, the guided wave is uniformly radiated and propagated in an angle of 360 degrees with the spiral coil as a center. Energy of the guided wave is distributed along the thickness direction of the material, so that defects in a whole thickness of the material can be detected, such as the in-body defect illustrated by the drawing marker 1 in FIG. 4.

Figure 9:
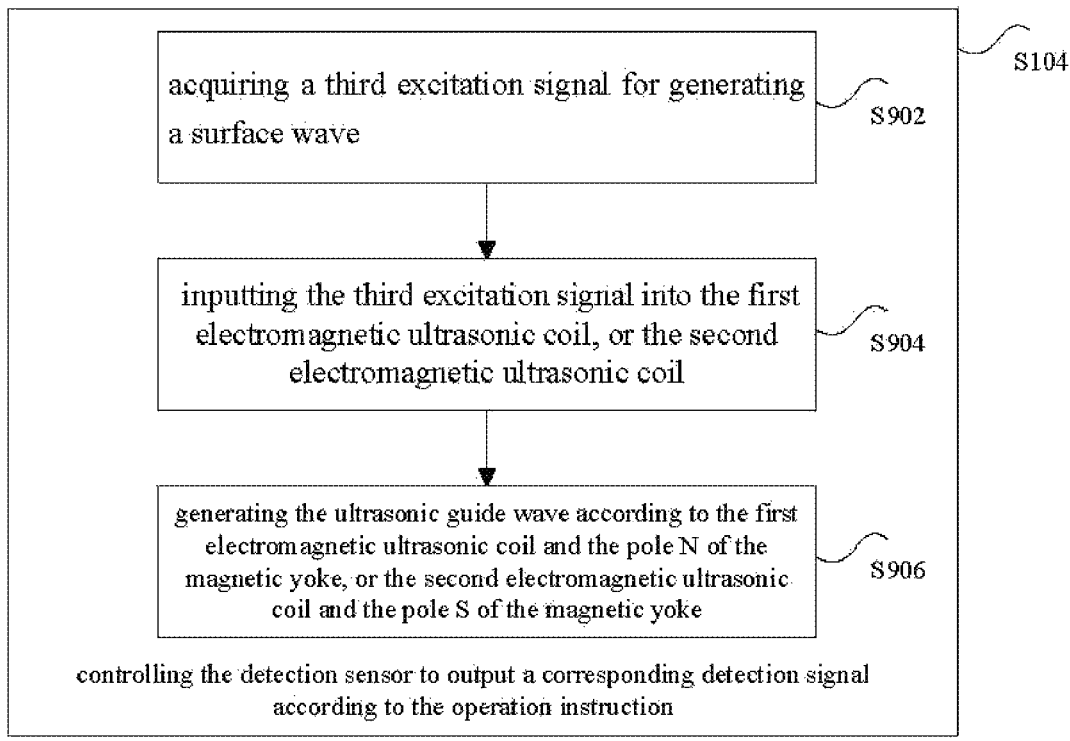
FIG. 9 shows a flow chart of the optional method for detecting multi-mode electromagnetic acoustic and magnetic flux leakage according to embodiments of the disclosure.

As an optional embodiment, under a condition of a working mode as surface wave detection, as shown in FIG. 9, controlling the detection sensor to output the corresponding detection signal according to the operation instruction in the step S104, including:

S902, acquiring a third excitation signal for generating a surface wave, herein, the third excitation signal has a third frequency;

S904, inputting the third excitation signal into the first electromagnetic acoustic coil, or the second electromagnetic acoustic coil;

S906, generating the surface wave according to the first electromagnetic acoustic coil and the pole N of the magnetic yoke, or the second electromagnetic acoustic coil and the pole S of the magnetic yoke.

Figure 10:
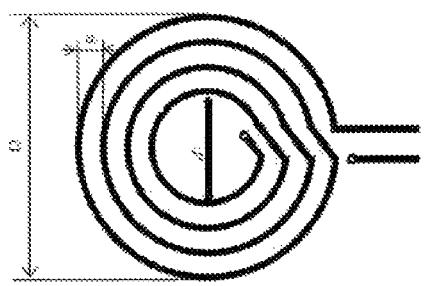
FIG. 10 shows a schematic diagram of size design of the optional multi-mode electromagnetic acoustic and magnetic flux leakage integral sensor according to embodiments of the disclosure.

Specifically, in the above embodiment, the spiral coil is arranged below the pole N or the pole S of the U-shaped magnetic yoke, as shown in FIG. 10, It can be known from the working principle of the electromagnetic vibration of the above-mentioned spiral coil that each coil produces a source of vibration in the spiral mirrored area on the surface of the ferromagnetic material. When the size of the coil meets $\alpha=\lambda_R$ and $d=N+1/2) \lambda_R$, herein, $\lambda_R$ is a surface wavelength, a is a distance of adjacent line sources, d is a diameter of a coil on an innermost side of the coils, and N is a positive integer, that is, the distance of the adjacent line sources is equal to a wavelength of the surface wave, the surface wave with the wavelength of $\lambda_R$ is excited or received. In one optional embodiment, the formed surface wave illustrated by the drawing marker 40 in FIG. 4, is adopted to detect a surface defect 2 of the tested object.

Figure 11:
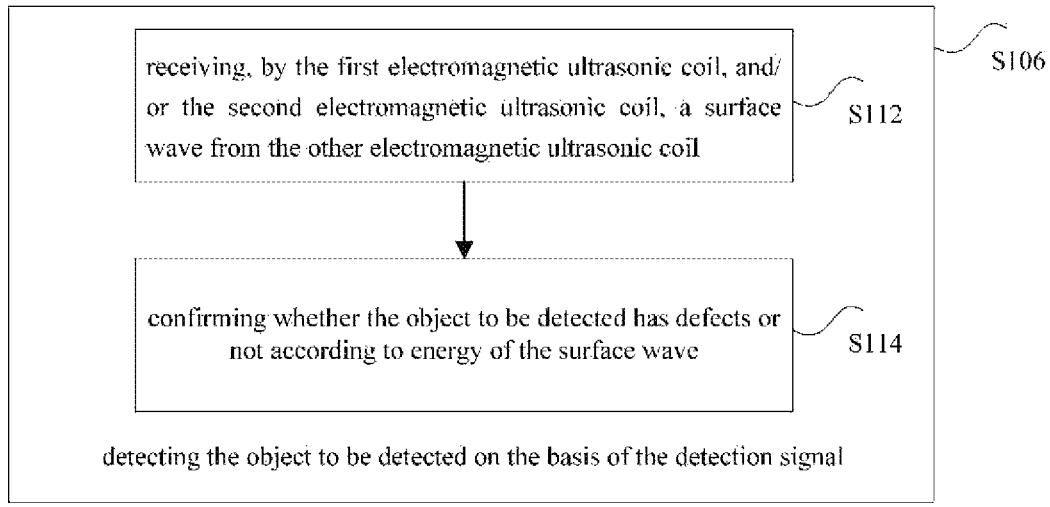
FIG. 11 shows a flow chart of the optional method for detecting multi-mode electromagnetic acoustic and magnetic flux leakage according to embodiments of the disclosure.

When surface wave detection is carried out on the basis of the above embodiment, two detection modes as follows are realized:

in one optional implementation mode, as shown in FIG. 11, detecting the object to be detected on the basis of the detection signal in the step S106, including:

S112, receiving the surface wave from the other electromagnetic acoustic coil by the first electromagnetic acoustic coil, and/or the second electromagnetic acoustic coil.

S114, confirming whether the detected object has defects according to energy of the surface wave.

Specifically, a one-excitation one-receiving detection mode is realized in the above embodiment, for example, the coil below the pole N is adopted as an excitation sensor to generate the surface wave, the coil below the pole S is adopted as a receiving sensor to receive the surface wave (on the contrary, the coil below the pole N is adopted as the receiving sensor, the coil below the pole S is adopted as the excitation sensor, with identical principles). If a detected material area (that is, a surface wave detection area) between the pole N and the pole S of the U-shaped magnetic yoke has a surface layer defect, whether the area has the defect or not is judged if energy of the surface wave received by the receiving sensor is smaller than that of the surface wave without defect, and the size of the defect is evaluated according to a reduction quantity of the energy.

Figure 12:
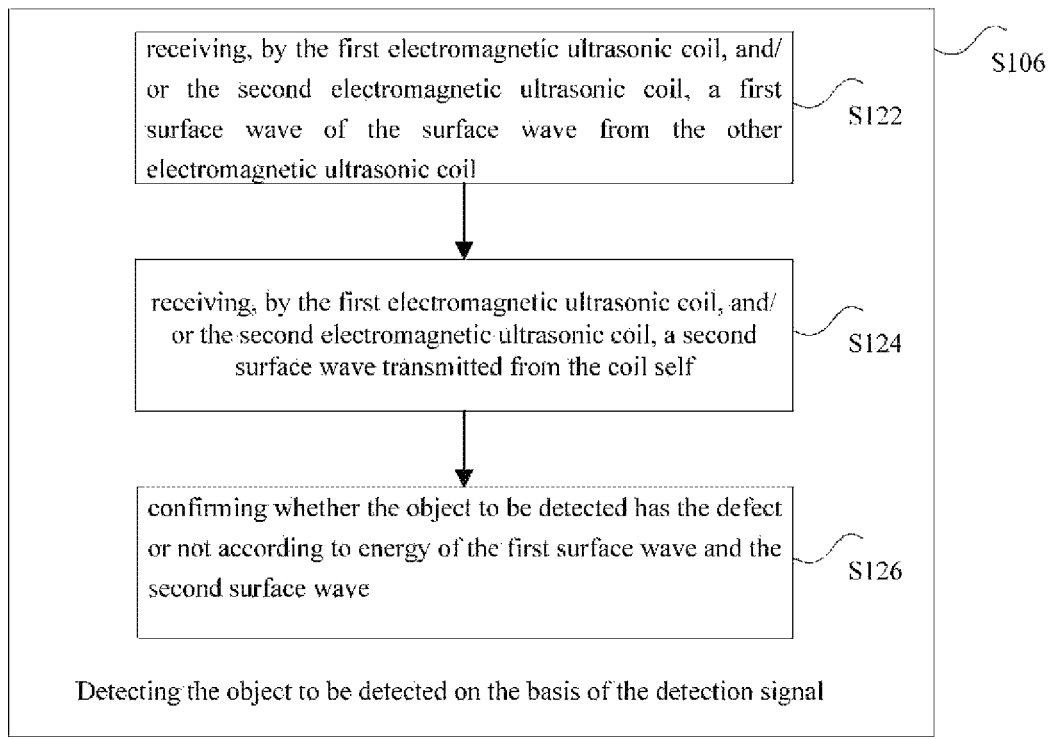
FIG. 12 shows a flow chart of the optional method for detecting multi-mode electromagnetic acoustic and magnetic flux leakage according to embodiments of the disclosure.

In the other optional implementation mode, as shown in FIG. 12, detecting the tested object on the basis of the detection signal in the step S106, including:

S122, receiving, a first surface wave of the surface wave from the other electromagnetic acoustic coil; by the first electromagnetic acoustic coil, and/or the second electromagnetic acoustic coil.

S124, receiving, a second surface wave transmitted from the coil self by the first electromagnetic acoustic coil, and/or the second electromagnetic acoustic coil;

S126, confirming whether the detected object has the defect or not according to energy of the first surface wave and the second surface wave.

Specifically, a self-excitation one-excitation one-receiving mode is realized, in the above embodiment. For example, the coil below the pole N is adopted as both the excitation and receiving sensor, and the coil below the pole S is adopted as the receiving sensor to receive the surface wave. At the moment, if the surface wave detection area has the surface layer defect, a forward propagation signal and a reflection propagation signal are received by the coil below the pole S and the coil below the pole N, and the size of the defect is accurately evaluated by means of a transmission coefficient and a reflection coefficient.

Figure 13:
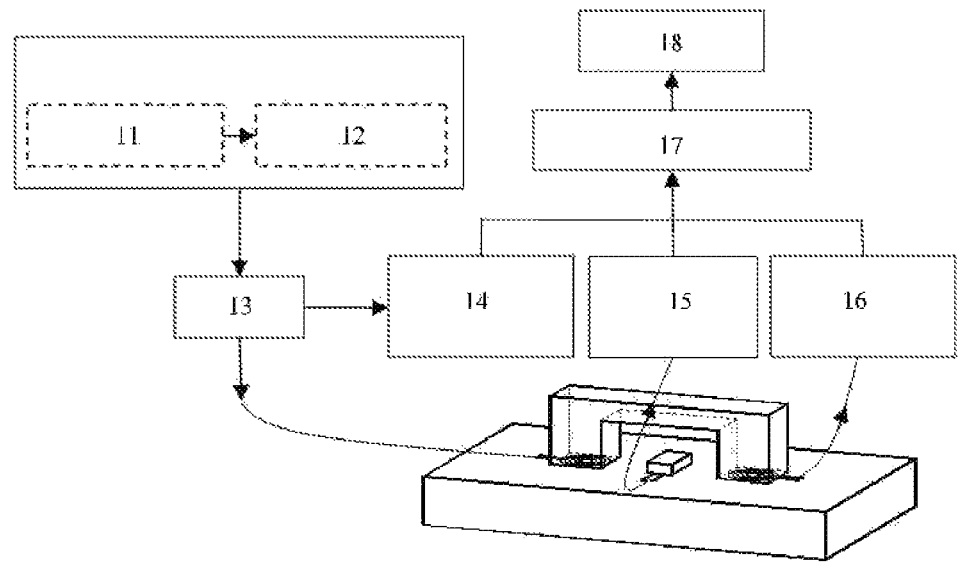
FIG. 13 shows a schematic diagram of a multi-mode electromagnetic acoustic and magnetic flux leakage integral detection system according to embodiments of the disclosure.

It needs to be noted that in the above embodiments, the first electromagnetic acoustic coil and the second electromagnetic acoustic coil have equivalence properties, that is, in an independent working mode, such as self-excitation self-receiving electromagnetic acoustic thickness measurement, guided wave detection and surface wave detection, the first electromagnetic acoustic coil or the second electromagnetic acoustic coil is adopted as a transducer, or the two coils are both used, and then an instrument is required to be equipped with double channels as electromagnetic acoustic excitation channels and have a time-division excitation function; in a one-excitation one-receiving synergetic working mode, such as surface wave detection and guided wave detection, any one of the first electromagnetic acoustic coil and the second electromagnetic acoustic coil is adopted as an excitation coil, and the other one is adopted as a receiving coil. In detection mode description as follows, the first electromagnetic acoustic coil is adopted as a main action sensor in the self-excitation self-receiving mode; in the one-excitation one-receiving mode, the first electromagnetic acoustic coil is adopted as the excitation sensor, and the second electromagnetic acoustic coil is adopted as the excitation sensor. Other situations may be easily inferred according to examples as follows:

as a preferable embodiment, FIG. 13 shows a multi-mode electromagnetic acoustic and magnetic flux leakage integral detection system according to embodiments of the disclosure; as shown in FIG. 13, the system includes: an electromagnetic acoustic excitation source (consisting of a signal generator 11, a power amplifier 12) a duplexer 13, an electromagnetic acoustic signal conditioning unit 14, a magnetic flux leakage signal conditioning unit 15, an electromagnetic acoustic guided wave signal conditioning unit 16, a multi-channel signal collector 17 and a host computer 18.

Herein, the electromagnetic acoustic excitation source including a signal generator and a power amplifier; is used for generating a high-power excitation signal. The electromagnetic acoustic excitation source has a frequency bandwidth range including the ultrasonic guided wave and the ultrasonic wave detection frequency which is generally within 10 kHz-20 MHz. In an excitation process, a narrow frequency band signal with a center frequency is controlled to be generated, and is transmitted into the first electromagnetic acoustic coil of the integral sensor after passing through the duplexer.

The duplexer allows the high-power excitation signal to enter the excitation sensor, limits the high-power excitation signal from entering the electromagnetic acoustic signal conditioning unit, and only allows a small signal smaller than a voltage (an electromagnetic acoustic receiving signal) to enter the electromagnetic acoustic signal conditioning unit.

An electromagnetic acoustic and guided wave signal conditioning unit has a function of amplifying received electromagnetic acoustic and electromagnetic acoustic guided wave signals, and may have analog filtering function.

The magnetic flux leakage signal conditioning unit works for the amplifying and filtering received magnetic flux leakage signals.

The electromagnetic acoustic guided wave signal conditioning unit has a function of amplifying received guided wave and surface wave signals, and may have the analog filtering function.

The multi-channel signal collector has a function of carrying out digital-to-analog conversion and sampling on signals received by the electromagnetic acoustic sensor, the magnetic sensitive element and the electromagnetic acoustic sensor after processing of the electromagnetic acoustic and guided wave signal conditioning unit, the magnetic flux leakage signal conditioning unit and the electromagnetic acoustic guided wave signal conditioning unit.

The host computer is used for controlling the detection system by means of software, and mainly has functions of controlling to output specific detection signals, recording the detection signals and carrying out signal processing, display and output when the control system is in different working modes.

Based on the above embodiments of the multi-mode electromagnetic acoustic and magnetic flux leakage integrated detection system, the following detection modes can be implemented;

I. Magnetic Flux Leakage Detection Mode

The magnetic yoke generates a stable and constant magnetic field and forms the magnetic path in the detected material. When the detected material has the defect, the magnetic sensitive element collect the magnetic flux leakage field signal and the receiving signal is input into the magnetic flux leakage signal conditioning unit to carry out signal amplification and processing, and is further input into a corresponding channel of the multi-channel signal acquirer to carry out analog-to-digital conversion, an acquired signal is transmitted to the software of the host computer, and the software of the host computer realizes acquisition and analysis on the magnetic flux leakage detection signal.

II. Thickness Measurement and Direct Incidence flaw Detection Working Mode

The signal generator generates the narrow frequency high-power signal with the central frequency as the electromagnetic acoustic bulk wave, the narrow frequency high-power signal is input into the first electromagnetic acoustic coil, and the ultrasonic bulk wave is excited and generated; the ultrasonic bulk wave reflected by the bottom surface of the material is received by the first electromagnetic acoustic coil and is converted into an electric signal, the electromagnetic signal is input into the guided wave signal conditioning unit by the duplexer to carry out signal amplification and processing, and is further input into a corresponding channel of the multi-channel signal acquirer to carry out analog-to-digital conversion, an acquired signal is transmitted to the software of the host computer, the software of the host computer realizes acquisition and analysis on the electromagnetic acoustic thickness measurement signal, and a material thickness value is obtained.

III. Guided Wave Detection Working Mode

The signal generator generates the narrow frequency high-power signal with the central frequency as the guided wave generated by the sensor, the narrow frequency high-power signal is input into the first electromagnetic acoustic coil, and the ultrasonic bulk wave is excited and generated: the ultrasonic bulk wave reflected by the bottom surface of the material is received by the first electromagnetic acoustic coil and is converted into an electric signal, the electromagnetic signal is input into the electromagnetic acoustic and guided wave signal conditioning unit by the duplexer to carry out signal amplification and processing, and is further input into a corresponding channel of the multi-channel signal collector to carry out analog-to-digital conversion, an acquired signal is transmitted to the software of the host computer, the software of the host computer realizes acquisition and analysis on the electromagnetic acoustic thickness measurement signal, and a material thickness value is obtained.

IV. Surface Wave Detection Working Mode

The signal generator generates the narrow frequency high-power signal with the central frequency as the surface wave generated by the sensor, the narrow frequency high-power signal is input into the first electromagnetic acoustic coil by the duplexer, and the surface wave is excited and generated; the surface wave is propagated on the surface of the detected material; when a defect is detected between the first electromagnetic acoustic coil and the second electromagnetic acoustic coil, a part of the surface wave is reflected, the other part of the surface wave is transmitted, a transmission wave is received by the second electromagnetic acoustic coil, and by means of received transmission wave information, detection on the defect on the surface of the detected material is realized.

Figure 14:
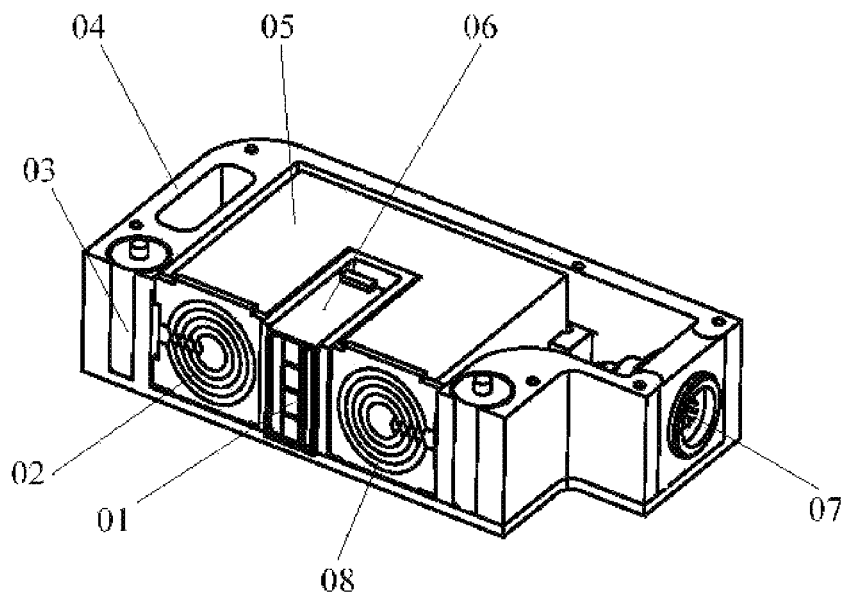
FIG. 14 shows a schematic diagram of the optional multi-mode electromagnetic acoustic and magnetic flux leakage integral detection sensor according to embodiments of the disclosure.

According to the above embodiment, FIG. 14 shows a schematic diagram of the optional multi-mode electromagnetic acoustic and magnetic flux leakage integral detection sensor according to embodiments of the disclosure; as shown in FIG. 14, the sensor includes: the U-shaped magnetic yoke 05, the excitation coil 02, the receiving coil 08, the magnetic flux leakage receiving component (magnetic sensitive element) 01, the magnetic flux leakage receiving component mounting base 06, a spring (not illustrated in the schematic diagram), rollers 03, a shell 04, a shell upper cover (not illustrated in the schematic diagram) and a wiring base 07. The U-shaped magnetic yoke 05 is mounted inside the shell; the excitation coil 02 and the receiving coil 08 are respectively positioned on bottom surfaces of two legs of the U-shaped magnetic yoke 05; the magnetic flux leakage receiving component 01 is mounted on the magnetic flux leakage receiving component mounting base 06; the magnetic flux leakage receiving component mounting base 06 is mounted on the shell 04 and is positioned in the middle of the U-shaped magnetic yoke 05; the spring is arranged between the magnetic flux leakage receiving component mounting base 06 and the shell 04, the magnetic flux leakage receiving component mounting base 06 is in certain sliding with the shell 04, and then the magnetic flux leakage receiving component 01 is in good contact with a detected component; the wiring base 07 is positioned on one side of the sensor; all wires of the excitation coil 02, the receiving coil 08 and the magnetic flux leakage receiving component 01 are connected with the wiring base 07; the rollers 03 are positioned at the bottom of the sensor to enable the sensor to move well on a detected surface; the upper cover of the shell 04 is kept matched with the shell 04, and is used for sealing the sensor after all components are mounted.

Preferably, shape sizes of the spiral coil in the sensor can be: D=18.2 mm, d=6.2 mm and α=0.4 mm. The U-shaped magnetic yoke 05 has an appearance size of 55*40*20 mm, the magnetic field intensity at the coil is about 5000 Gs, and the magnetic sensitive element may be a Hall chip.

Figure 15:
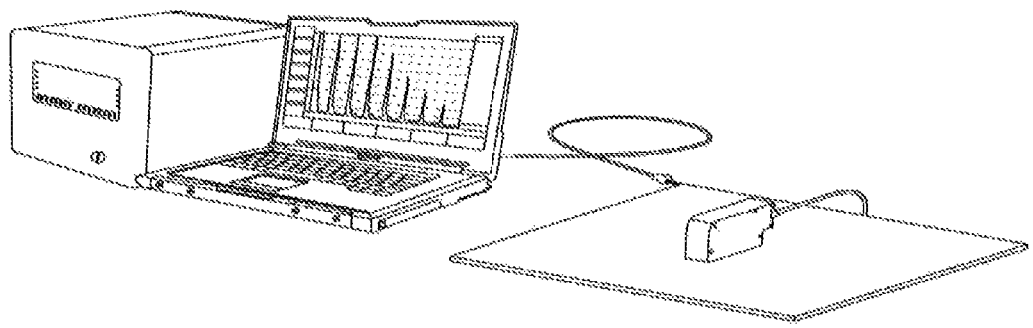
FIG. 15 shows a schematic diagram of the optional multi-mode electromagnetic acoustic and magnetic flux leakage integral detection device according to embodiments of the disclosure.
Figure 16:
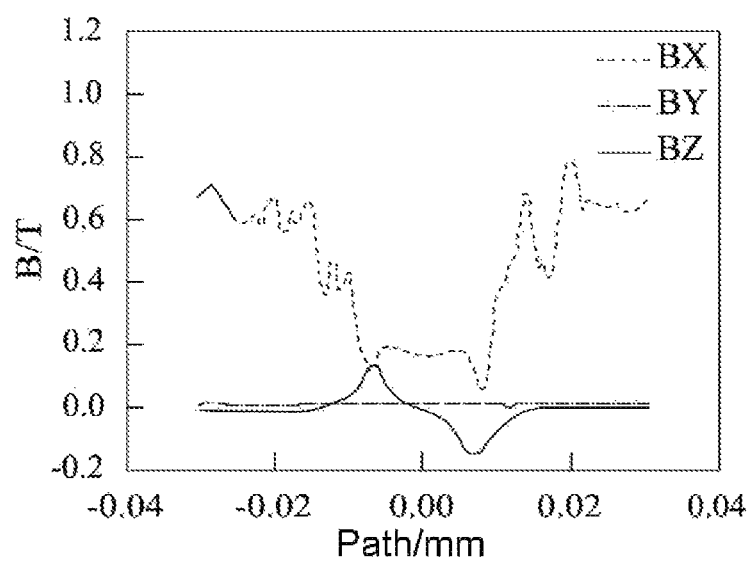
FIG. 16 shows a schematic diagram of a three-dimensional magnetic flux detection signal according to embodiments of the disclosure.
Figure 17:
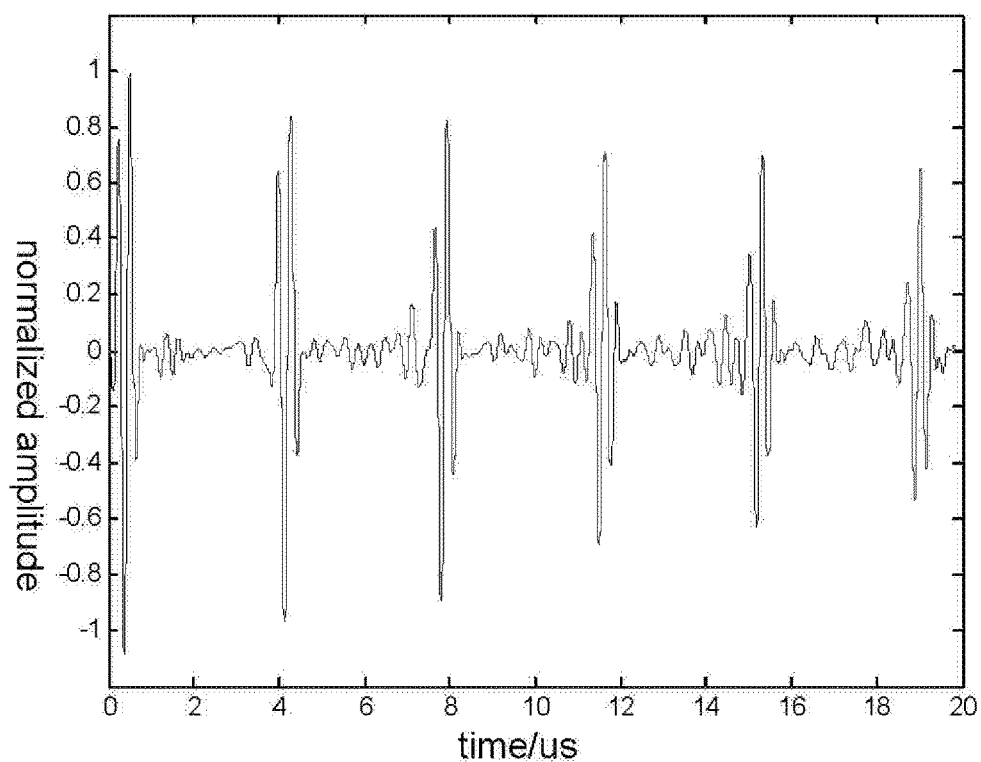
FIG. 17 shows a schematic diagram of an electromagnetic acoustic thickness measurement detection signal according to embodiments of the disclosure.
Figure 18:
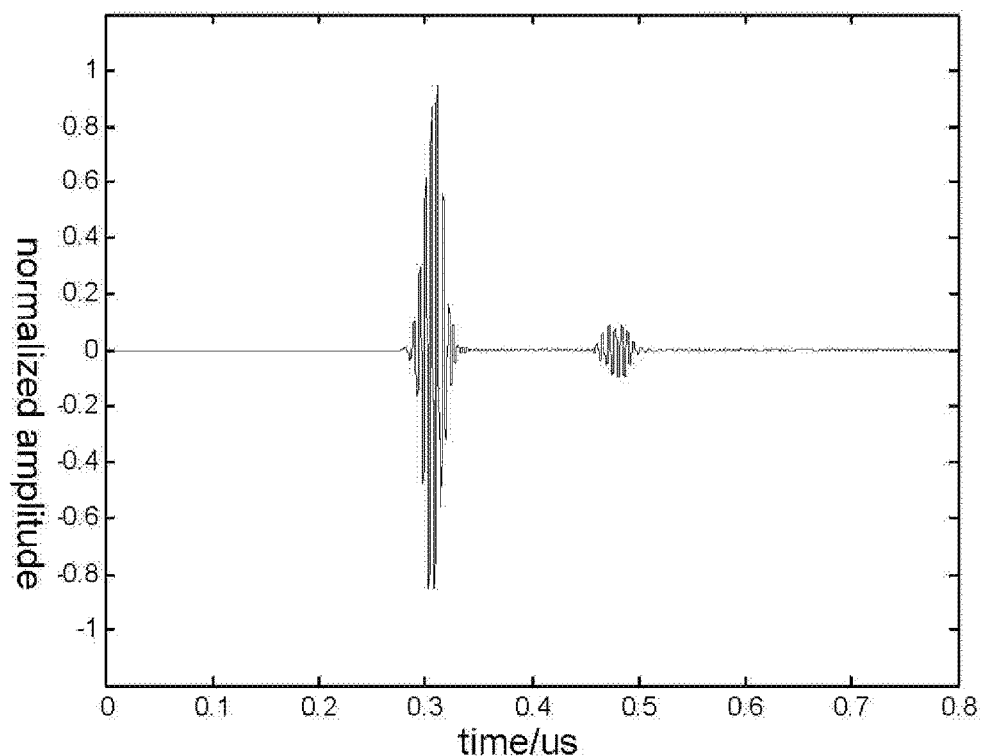
FIG. 18 shows a schematic diagram of an ultrasonic guided wave detection signal according to embodiments of the disclosure.
Figure 19:
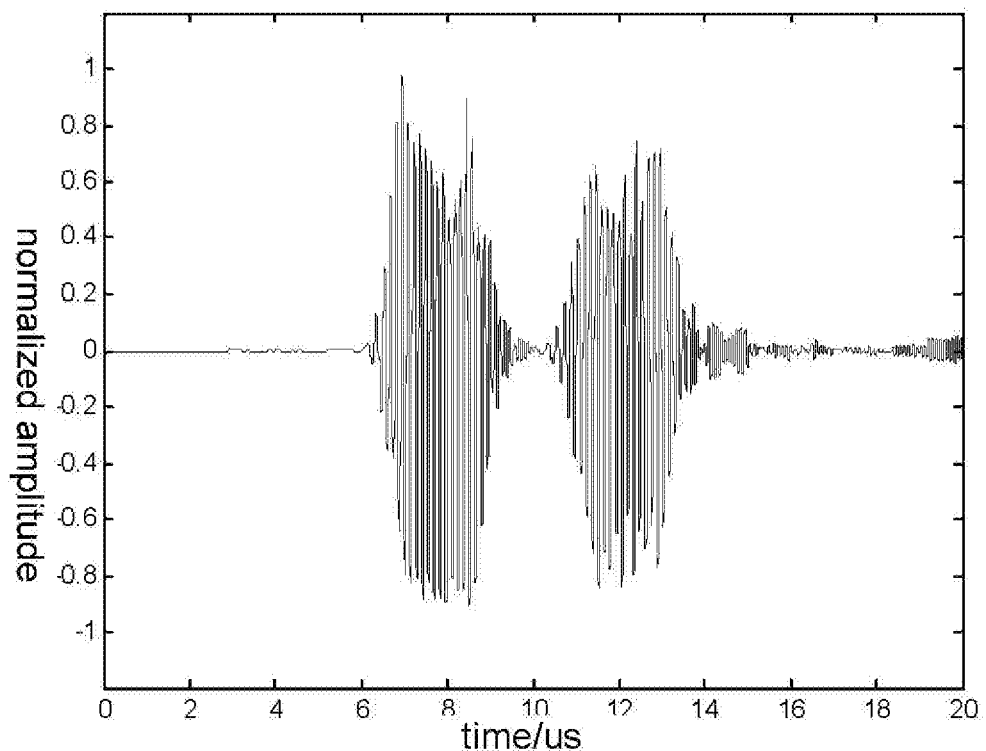
FIG. 19 shows a schematic diagram of a surface wave detection signal according to embodiments of the disclosure.

As an optional implementation mode, FIG. 15 shows a schematic diagram of the optional detection device according to embodiments of the disclosure. A steel plate of 6 mm thick is taken as a detection example. As shown in FIG. 15, the sensor is arranged above the steel plate. In the magnetic flux leakage detection mode, when the sensor scans a groove defect which is 4 mm deep and 5.92 mm wide, magnetic flux leakage intensity signals which are detected by the sensor in three directions x, y and z are as shown in FIG. 16, herein, BX is a magnetic field intensity signal in a direction x, BY is a magnetic field intensity signal in a direction y, and BZ is a magnetic field intensity signal in a direction z; in an electromagnetic acoustic thickness measurement mode, as shown in FIG. 17, Three-cycle sine wave modulated with a center frequency of 3.5 MHz Hanning window is used as the excitation signa, a bottom surface echo wave is acquired by the first electromagnetic acoustic coil in the self-excitation self-receiving working mode, at the moment. The velocity of the transverse wave in the steel plate is 3240 m/s, two echo waves have a time difference of 3.704 us, and a steel plate thickness measurement value is 0 nm; in the ultrasonic guided wave working mode, as shown in FIG. 18, seven-cycle sine wave modulated with a center frequency of 190 kHz Hanning window is used as the excitation signa, and a Lamb wave signal is excited and generated by the first electromagnetic acoustic coil in the steel plate; in the surface wave working mode, as shown in FIG. 19, seven-cycle sine wave modulated with a center frequency of 7.5 MHz Harming window is used as the excitation signals, the excitation signals are excited by the first electromagnetic acoustic coil, a surface wave detection signal is received by the second electromagnetic acoustic coil, and at the moment no defect is defected in a propagation way.

It needs to be noted that when multiple technical means such as magnetic flux leakage, ultrasonic bulk wave, surface wave and guided wave are required in multi-target non-destructive testing, a conventional separated sensor and system may cause the following main problems: (1) sensors and instrument systems of magnetic flux leakage detection, ultrasonic bulk wave thickness measurement and detection, surface wave detection and ultrasonic guided wave detection are generally separated or some of them are mechanically combined, the number of sensors is large or very complicated, and the instrument system is more; (2) when detection is carried out, the separated sensors and systems generally need multiple times of repeated detection in different steps, so that a plenty of procedure steps are needed, a detection process is tedious, and long detection time is required; (3) in a robot detection situation, multiple detection sensors are operated through multiple robots, and even if a mechanical combined sensor is used, the instrument systems are hard to combine, so that the size and the weight of the robot is increased, particularly a wall climbing detection robot and a pipeline detection robot (pipeline pig) are greatly affected, and it is impossible to integrate the robots into one in some situations.

By adopting technical solutions of the above embodiments of the disclosure, following technical effects may be realized: (1) the multi-mode electromagnetic acoustic and magnetic flux leakage integral sensor is capable of generating transverse waves, surface wave and ultrasonic guided wave (guided wave or SH guided wave), and defects of repeated detection or sensor complexity caused by multiple sensors of mechanical integration of multiple types of sensors in a conventional detection technique are avoided; (2) by adopting the multi-mode electromagnetic acoustic and magnetic flux leakage integral sensor, sizes of the sensors in the conventional magnetic flux leakage detection systems are barely changed, the sensor is conveniently applied to various detection robots such as detection robots for detecting corrosion of bottom plates and wall plates of storage tanks, and pipeline detection robots (pipeline pigs); (3) by adopting the detection instrument system, ultrasonic wave thickness measurement and detection, ultrasonic guided wave detection, surface wave detection and magnetic flux leakage detection are realized by using one same instrument system, and a defect that multiple instrument systems are adopted for repeated detection or a detection device is equipped with multiple sets of instrument systems in the conventional detection technique, is avoided; (4) the detection instrument has the characteristics of being high in integration degree, small in size and light in weight, and can be conveniently installed in various detection robot systems; (5) by adopting the multi-mode electromagnetic acoustic and magnetic flux leakage integral sensor and instrument, ultrasonic wave thickness measurement and detection, ultrasonic guided wave detection, surface wave detection and magnetic flux leakage detection are realized synchronously, so that synchronous detection on corrosion, surface cracks and internal damage of ferromagnetic metallic material apparatuses is achieved, a comprehensive types of flaws are detected, and high detection efficiency is achieved.

Embodiment 2

According to an embodiment of the disclosure, an embodiment of a sensor for electromagnetic acoustic and magnetic flux leakage Integrated detection is provided.

FIG. 2 shows a schematic diagram of a multi-mode electromagnetic acoustic and magnetic flux leakage detection sensor according to embodiments of the disclosure; as shown in FIG. 2, the drawing marker 201 illustrates an detected object the sensor includes: a U-shaped magnetic yoke 203, for magnetizing a material of the object to be detected, and used for generating a magnetic field signal in the object to be detected; a magnetic flux leakage receiving component 205, positioned in the middle of the U-shaped magnetic yoke, and used for detecting whether a magnetic flux leakage field signal is generated outside the detected object or not; the first electromagnetic acoustic coil 207, located below the N pole of the U-shaped yoke, combined and used with a lower end of the pole N of the U-shaped magnetic yoke, and used for generating or receiving one or more of detection waves as follows: ultrasonic bulk wave, ultrasonic guided wave and surface wave; a second electromagnetic acoustic coil 209, positioned below a pole S of the U-shaped magnetic yoke, combined and used with a lower end of the pole S of the U-shaped magnetic yoke, and used for generating or receiving one or more of detection waves as follows: ultrasonic bulk wave, ultrasonic guided wave and surface wave.

Optionally, the U-shaped magnetic yoke 203 may be a permanent magnet or an electromagnet for generating a excitation magnetic field for magnetic flux leakage detection and a bias magnetic field for electromagnetic acoustic detection; if the magnetic yoke is the permanent magnet, the magnetic yoke is used for providing a long-acting magnetic field; if the magnetic yoke is the electromagnet (may be a magnetic yoke wound by a coil), a magnetic field needs to be generated in a direct current power on/off mode.

It needs to be noted that the U-shaped magnetic yoke may be also replaced by a horseshoe-shaped magnetic yoke or a U-shaped magnetic yoke obtained by means of assembling, and magnetic yokes with functions of the U-shaped magnetic yoke are all included under the protection of the disclosure.

In one optional embodiment, the magnetic flux leakage receiving component 205 may be a magnetic sensitive element for measuring magnitude and directions of a magnetic field and for acquiring a magnetic flux leakage detection signal.

By adopting the multi-mode electromagnetic acoustic and magnetic flux leakage detection integral sensor provided by the disclosure, magnetic flux leakage detection and electromagnetic acoustic detection are simultaneously realized by using one sensor, herein, electromagnetic acoustic detection at least includes: ultrasonic bulk wave thickness measurement and direct incidence flaw detection, ultrasonic guided wave detection functions and surface wave detection.

Specifically, any one of the first electromagnetic acoustic coil 207 and the second electromagnetic acoustic coil 209 is combined with the U-shaped magnetic yoke to form an electromagnetic acoustic sensor. Preferably, the first electromagnetic acoustic coil 207 and the second electromagnetic acoustic coil 209 are annular coils which are respectively positioned below the pole N and the pole S of the U-shaped magnetic yoke to provide the bias magnetic field by the U-shaped magnetic yoke, after excitation signals with different excitation frequencies are input into the first electromagnetic acoustic coil 207 or the second electromagnetic acoustic coil 209, the first electromagnetic acoustic coil 207 and/or the second electromagnetic acoustic coil 209 are used for generating and receiving ultrasonic bulk wave, surface wave and ultrasonic guided wave.

As an optional implementation mode, a magnetic flux leakage detecting sensor for magnetic flux leakage detection can be constructed by a U-shaped magnetic yoke and a magnetic sensing element, the U-shaped magnetic yoke is used as an excitation device, the magnetic sensitive element, is used as a magnetic field detector, and a ferromagnetic material is magnetized by using the alternative current or permanent magnetic U-shaped magnetic yoke, if a surface or a subsurface of the material has defects, it will cause distortion of the magnetic induction line in the material, a magnetic flux leakage field is generated on the surface above the defect, the magnetic flux leakage field is detected by using the magnetic field detector, then detection on the defect on the surface or the subsurface of the ferromagnetic material is realized. It has great application prospects in tank bottom plate inspection, pipeline inspection etc.

As another optional implementation mode, the lower end of the pole N or the pole S of the U-shaped magnetic yoke and the electromagnetic acoustic coil form an electromagnetic acoustic detection sensor for electromagnetic acoustic detection, an ultrasonic bulk wave, surface wave and an ultrasonic guided wave are generated for non-destructive testing, and the mode has multiple advantages of no material surface polishing, no coupling agent, non-contact detection, etc. and is particularly applicable to automatic ultrasonic detection apparatuses. The ultrasonic bulk wave is generally applied to pulse echo type thickness measurement or flaw detection (is a point detection technique), the surface wave is generally applied to detection on defects on a surface of a structure, the ultrasonic guided wave is generally used for detection on a defect of a thin-wall structure (is a surface detection technique). At present, a robot with an electromagnetic acoustic direct incidence sensor for pulse echo thickness measurement is available and is generally applied to large-size steel structure wall thickness measurement and corrosion detection. Compared with a piezoelectric ultrasonic detection robot, the electromagnetic acoustic detection robot does not need to be equipped with a grinding mechanism and a water spray coupling mechanism, so that machine mechanism components, control modules, spaces, weights, cables and the like are reduced, and great advantages are achieved.

From the foregoing, in the embodiment of the disclosure, by adopting the electromagnetic acoustic wave and magnetic flux leakage integral detection mode, the U-shaped magnetic yoke, the magnetic flux leakage receiving component, the first electromagnetic acoustic coil and the second electromagnetic acoustic coil are combined to form the multi-mode electromagnetic acoustic and magnetic flux leakage detection sensor, wherein, the U-shaped magnetic yoke is used for magnetizing a material of a detected area of the object to be detected, and used for generating a magnetic field signal in the detected area; the magnetic flux leakage receiving component is positioned in the middle of the U-shaped magnetic yoke, and is used for detecting whether a magnetic field signal is generated outside the detected area of the object to be detected or not; the first electromagnetic acoustic coil is positioned below the pole N of the U-shaped magnetic yoke, and is combined and used with the lower end of the pole N of the U-shaped magnetic yoke to form the electromagnetic acoustic sensor; the second electromagnetic acoustic coil is positioned below the pole S of the U-shaped magnetic yoke, and is combined and used with the lower end of the pole S of the U-shaped magnetic yoke to form the electromagnetic acoustic sensor, purposes of simplifying system constitution components and rapidly detecting corrosion, surface cracks and internal damage of the magnetic metallic material are achieved, the invention further solves the technical problem that the prior art cannot realize the comprehensive detection of the ultrasonic bulk wave, the ultrasonic guided wave, the surface wave and the magnetic flux leakage of the tested material, resulting in incomplete detection and low working efficiency.

It needs to be noted that due to a unique structure of the electromagnetic acoustic and magnetic flux leakage integral detection sensor, the sensor is capable of realizing, but are not limited to several detection functions: a magnetic flux leakage detection function, an ultrasonic bulk wave thickness measurement and direct incidence flaw detection function, an ultrasonic guided wave detection function and a surface wave detection function.

The detection functions are illustrated by FIG. 4. FIG. 4 shows a schematic diagram of working principles of the optional electromagnetic acoustic and magnetic flux leakage integral sensor according to embodiments of the disclosure. As shown in FIG. 4, drawing marker 201 illustrates the object to be detected (ferromagnetic detected component), drawing marker 203 illustrates the U-shaped magnetic yoke, and drawing marker 205 illustrates the magnetic sensitive element.

A first detection function, that is, magnetic flux leakage detection, on the basis of the integral sensor as shown in FIG. 4, after the object to be detected (ferromagnetic detected component) is magnetized by using the U-shaped magnetic yoke 203, the magnetic signal is generated in the object to be detected to form a magnetizing zone 10, as shown in FIG. 2, the U-shaped magnetic yoke 203 and the object to be detected (ferromagnetic detected component) form a closed magnetic path, if the surface or a near surface of the detected component has defects (such as a surface layer defect illustrated by the drawing marker 2 in FIG. 4), the magnetic path is distorted, a part of a magnetic induction line enters the air, leaks outside the detected component to form a magnetic flux leakage field and is detected by using the magnetic sensitive element 205, and by analyzing the leakage magnetic field signals, whether the detected component has defects or not is confirmed.

A second detection function, namely, the ultrasonic bulk wave thickness measurement and direct incidence flaw detection function. On the basis of the integral sensor as shown in FIG. 4, any one end below the pole N or the pole S of the magnetic yoke (such as the U-shaped magnetic yoke) and the coil below form the electromagnetic acoustic sensor. Specifically, FIG. 4 is adopted to illustrate an excitation process of ultrasonic waves: when a bulk wave response frequency signal $f_1$ is introduced into the coil (the first electromagnetic acoustic coil 207 or the second electromagnetic acoustic coil 209), generally a narrow frequency band transient state pulse signal with a central frequency of several megahertz, an eddy field 60 is induced and generated from a ferromagnetic conductor detected material, and basic principles of electromagnetic induction show that an eddy field is nearly a mirror image of an annular coil and has a eddy direction opposite to a current direction in the coil, under the action of a vertical magnetic field provided by one magnetic pole (the pole N or the pole S) of the U-shaped magnetic yoke, the eddy field 60 is subjected to a Lorentz force, and because of the action force, a mass point below the coil has mechanical vibration in a frequency same as that of current in the coil. In addition, a lead of the coil also generates a dynamically changed magnetic field, because of the dynamic magnetic field, a ferromagnetic material below each line element has a magnetizing force and a magnetostrictive force, and because of the action forces, the mass point below the coil also has mechanical vibration in a frequency same as that of current in the coil. Under the combined action of the above three forces, an vertical incidence transverse wave 20 is generated in the ferromagnetic guided wave material by means of coupling, and the transverse wave 20 is adopted for thickness measurement or vertical incidence flaw detection on an area right below the coil. When the ultrasonic bulk wave encounters the bottom surface of the object to be tested, a reflection wave is generated, the reflection wave is transmitted to the surface of the material, mass point vibration on the surface of the material in the magnetic field is caused, an electromagnetic wave radiating to the space around is generated, and is detected by the coil.

A third detection function, namely, an ultrasonic guided wave detection function. On the basis of the integral sensor as shown in FIG. 4, ultrasonic guided wave detection is realized through the annular coil sensor (Only need one as an incentive) below one of the pole N and the pole S of the magnetic yoke (U-shaped magnetic yoke). Electromagnetic ultrasonic working principles of the annular coil show that a vibration source is generated from each coil in an annular mirror image area on the surface of the ferromagnetic material. For a structure of a certain material and a certain thickness, a single S0 modal guided wave is excited and generated at some frequency section (working frequency) at low frequency (50 kHz-500 kHz). In one optional embodiment, as shown in 30 in FIG. 4, a generated guided wave is adopted to detect defects in a whole thickness of the object to be detected, such as an in-body defect illustrated by the drawing marker 1 in FIG. 4. The guided wave generally has a narrow frequency band as the working frequency, and when the single S0 modal guided wave is excited and generated, a narrow frequency modulation signal is adopted as the detection signal. Because of symmetry of the annular coil, the guided wave is uniformly radiated and diffused in an angle of 360 degrees with the annular coil as a center guided wave energy is distributed in a thickness direction of the material, so that defects in a whole thickness of the material are detected, such as the guided wave illustrated by the drawing marker 30 in FIG. 4, and drawing marker 1 shows the in-body defect.

A four detection function, namely, surface wave detection. On the basis of the integral sensor as shown in FIG. 4, annular coil is arranged below the pole N or the pole S of the U-shaped magnetic yoke, and the electromagnetic acoustic working principles of the annular coil show that each coil is capable of generating the vibration source in the annular mirror image area on the surface of the ferromagnetic material. FIG. 10 shows the schematic diagram of shape and size design of the sensor. As shown in FIG. 10, D is a diameter of a coil on the outermost side of the coils. In one optional embodiment, sizes of the first electromagnetic acoustic coil and the second electromagnetic acoustic coil meet the following formula:

$$\alpha = \lambda R \text{ and } d = (N+1/2)\lambda R$$

$\lambda R$ is a surface wave wavelength, $\alpha$ is a distance of adjacent line sources, d is a diameter of a coil on an innermost side of the coils, and N is a positive integer, that is, the distance of the adjacent line sources is equal to a wavelength of the surface wave, the surface wave with the wavelength of $\lambda_R$ is excited or received. In one optional embodiment, the formed surface wave is illustrated by the drawing marker 40 in FIG. 4, and is adopted to detect a surface defect 2 of the object to be detected.

In one optional embodiment, the electromagnetic acoustic working principles of the annular coil show that the vibration source is generated by each coil in the annular mirror image area on the surface of the ferromagnetic material. When detecting surface waves by the above formula, there are two detection modes:

mode I: one-excitation and one-receiving detection mode, for example, the coil below the pole N is adopted as the excitation sensor for exciting and generating the surface wave, the coil below the pole S is adopted as the receiving sensor for receiving the surface wave (on the contrary, the coil below the pole N is adopted as the receiving sensor, the coil below the pole S is adopted as the excitation sensor, with identical principles). If a detected material area (that is, a surface wave detection area) between the pole N and the pole S of the U-shaped magnetic yoke has a surface layer defect, whether the area has the defect or not is judged if energy of the surface wave received by the receiving sensor is smaller than that of the surface wave without defect, and the size of the defect is evaluated according to a reduction quantity of the energy.

Mode II: self-excitation and self-receiving and one-excitation one-receiving mode, for example, the coil below the pole N is adopted as both the excitation sensor and the receiving sensor, and the coil below the pole S is adopted as the receiving sensor to receive the surface wave. At this time, if the surface wave detection area has the surface layer defect, a forward propagation signal and a reflection propagation signal are received by the coil below the pole S and the coil below the pole N, and the size of the defect is accurately evaluated by means of a transmission coefficient and a reflection coefficient.

Optionally, the magnetic flux leakage receiving component is the magnetic sensitive element, and preferably, the magnetic sensitive element is a Hall chip.

Optionally, the sensor further includes: a magnetic flux leakage receiving component mounting base and shell, wherein, the magnetic flux leakage receiving component is mounted on the magnetic flux leakage receiving component mounting base, a spring is arranged between the magnetic flux leakage receiving component mounting base and the shell, and then the magnetic flux leakage receiving component mounting base is in certain sliding with the shell.

In one optional embodiment, FIG. 14 shows a schematic diagram of the optional multi-mode electromagnetic acoustic and magnetic flux leakage detection sensor according to embodiments of the disclosure; as shown in FIG. 14, the sensor includes: the U-shaped magnetic yoke 05, the excitation coil 02, the receiving coil 08, the magnetic flux leakage receiving component (magnetic sensitive element) 01, the magnetic flux leakage receiving component mounting base 06, a spring (not illustrated in the schematic diagram), rollers 03, a shell 04, a shell upper cover (not illustrated in the schematic diagram) and a wiring base 07. The U-shaped magnetic yoke 05 is mounted inside the shell; the excitation coil 02 and the receiving coil 08 are respectively positioned on bottom surfaces of two legs of the U-shaped magnetic yoke 05; the magnetic flux leakage receiving component 01 is mounted on the magnetic flux leakage receiving component mounting base 06; the magnetic flux leakage receiving component mounting base 06 is mounted on the shell 04 and is positioned in the middle of the U-shaped magnetic yoke 05; the spring is arranged between the magnetic flux leakage receiving component mounting base 06 and the shell 04, the magnetic flux leakage receiving component mounting base 06 is in certain sliding with the shell 04, and then the magnetic flux leakage receiving component 01 is in good contact with a detected component; the wiring base 07 is positioned on one side of the sensor; all wires of the excitation coil 02, the receiving coil 08 and the magnetic flux leakage receiving component 01 are connected with the wiring base 07; the rollers 03 are positioned at the bottom of the sensor to enable the sensor to move well on a detected surface; the upper cover of the shell 04 is kept matched with the shell 04, and is used for sealing the sensor after all components are mounted.

Preferably, shape sizes of the annular coil in the sensor can be: D=18.2 mm, d=6.2 mm and $\alpha$=0.4 mm. The outer shape of the U-shaped yoke 05 is 55×40×20 mm, the magnetic field intensity at the coil is about 5000 Gs, and the magnetic sensitive element may be.

Embodiment 3

According to an embodiment of the disclosure, an embodiment of a system for detecting multi-mode electromagnetic acoustic and magnetic flux leakage is provided.

FIG. 13 shows a schematic diagram of a system for detecting multi-mode electromagnetic acoustic and magnetic flux leakage according to embodiments of the disclosure, as shown in FIG. 13, the system includes any one of the optional or preferred multi-mode electromagnetic acoustic and magnetic flux leakage detection sensor of embodiment 1, and a signal generator 11 and a power amplifier 12, herein, the signal generator is used for generating excitation signals for the first electromagnetic acoustic coil and the second electromagnetic acoustic coil, and the power amplifier is used for amplifying the excitation signals.

Herein, the signal generator and the power amplifier form an electromagnetic acoustic excitation source. The electromagnetic acoustic excitation source has a frequency bandwidth range including the ultrasonic guided wave and the ultrasonic wave detection frequency which is generally within 10 kHz-20 MHz. In an excitation process, a narrow frequency band signal with a specific dominant frequency is controlled to be generated, and is transmitted into the first electromagnetic acoustic coil of the integral sensor after passing through a duplexer.

From the foregoing, in the embodiment of the disclosure, by using the electromagnetic acoustic and magnetic flux leakage integral detection mode, the signal generator and the power amplifier form a system for detecting multi-mode electromagnetic acoustic and magnetic flux leakage, wherein, the signal generator is used to generate the excitation signal for the first electromagnetic acoustic coil and the second electromagnetic acoustic coil, and the power amplifier is used for amplifying the excitation signals, purposes of simplifying system constitution components and rapidly detecting corrosion, surface cracks and internal damage of the ferromagnetic metallic material are achieved, and furthermore technical problems that in the conventional art incomprehensive detection and low working efficiency are caused since comprehensive detection of ultrasonic bulk wave, ultrasonic guided wave, surface wave and magnetic flux leakage of the detected material cannot be achieved, are solved.

Optionally, as shown in FIG. 13, the above system further includes: a duplexer 13, for inputting the amplified excitation signal into the first electromagnetic acoustic coil and the second electromagnetic acoustic coil, and for receiving an echo signal detected by the first electromagnetic acoustic coil and the second electromagnetic acoustic coil.

In one optional embodiment, the duplexer allows the high-power excitation signal to enter the excitation sensor, limits the high-power excitation signal into the electromagnetic acoustic signal conditioning unit 14, and only allows a small signal smaller than a voltage (an electromagnetic acoustic receiving signal) to enter the electromagnetic acoustic signal conditioning unit 14.

Optionally, as shown in FIG. 13, the system further includes: a multi-channel signal acquirer 17, for receiving the echo signal detected by the first electromagnetic acoustic coil 207 and the second electromagnetic acoustic coil 209 and the magnetic flux leakage signal detected by the magnetic flux leakage receiving component.

In one optional embodiment, the multi-channel signal acquirer has a function of carrying out digital-to-analog conversion and sampling on signals received by the electromagnetic acoustic sensor, the magnetic sensitive element and the electromagnetic acoustic sensor after processing of the electromagnetic acoustic and guided wave signal conditioning unit, the magnetic flux leakage signal conditioning unit 15 and the electromagnetic acoustic guided wave signal conditioning unit 16.

Optionally, as shown in FIG. 13, the system further includes: a host computer 18, for analyzing the echo signal and/or the magnetic field signal uploaded by the multi-channel signal acquirer, and for confirming whether the object to be detected has defects according to an analysis result.

In one optional embodiment, the host computer 18 is used for controlling the detection system, used for controlling the control system to output specific detection signal in different working modes, and used for recording the detection signal and carrying out signal, processing, display and output.

In one optional embodiment, the electromagnetic acoustic and guided wave signal conditioning unit has a function of amplifying received electromagnetic acoustic and electromagnetic acoustic guided wave signals, and may have the analog filtering function.

The magnetic flux leakage signal conditioning unit 15 has a function of amplifying and filtering the received magnetic flux leakage signal.

The electromagnetic acoustic guided wave signal conditioning unit 16 has a function of amplifying received guided wave and surface wave signals, and may have the analog filtering function.

Embodiment 4

Figure 20:
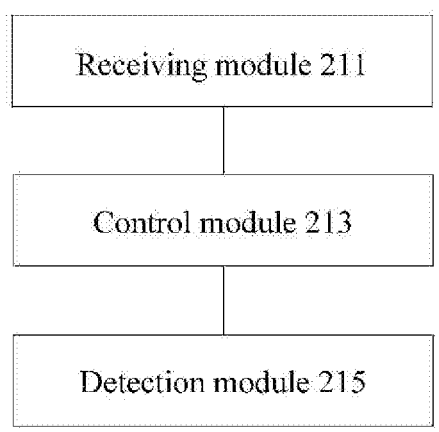
FIG. 20 shows a schematic diagram of a device for detecting multi-mode electromagnetic acoustic and magnetic flux leakage according to embodiments of the disclosure.

According to an embodiment of the disclosure, an embodiment of a device for realizing the electromagnetic acoustic and magnetic flux leakage detection method is further provided. FIG. 20 shows a schematic diagram of a device for detecting multi-mode electromagnetic acoustic and magnetic flux leakage according to embodiments of the disclosure. As shown in FIG. 20, the device includes: a receiving module 211, a control module 213 and a detection module 215.

Herein, the receiving module 211, used for receiving, an operation instruction for detecting an object to be detected, and the operation instruction is used for controlling a detection sensor to enter into any one or more of working modes as follows: magnetic flux leakage detection, ultrasonic bulk wave detection, ultrasonic guided wave detection and surface wave detection;

the control module 213, used for controlling the detection sensor to output a corresponding detection signal according to the operation instruction;

the detection module 215, used for detecting the object to be detected on the basis of the detection signal.

It needs to be noted that as a part of the device, the receiving module 211, the control module 213 and the detection module 215 are operated in a computer terminal, functions of the modules are executed by a processor in the computer terminal, and the computer terminal may be terminal equipment such as smart phones (such as an Android mobile phone and iOS mobile phone), tablet personal computers, handheld computers, mobile internee devices, MID, and PAD.

From the foregoing, in the embodiment of the disclosure, by using the multi-mode electromagnetic acoustic and magnetic flux leakage integral sensor composed of the U-shaped magnetic yoke, the electromagnetic acoustic coil and the magnetic sensitive element, receiving by the host computer, the operation instruction which is input by the user and is used for detecting the object to be detected, controlling the detection sensor to enter into any one or more working modes according to the operation instruction, outputting the detection signal corresponding to the working mode, and finally detecting the object to be detected according to the detection signal, the purpose that multiple detection modes such as magnetic flux, leakage detection and electromagnetic acoustic detection are realized by using one sensor is achieved, technical effects that complexity and cost of the detection system are reduced and detection efficiency is improved are achieved, and furthermore technical problems that in the conventional art incomprehensive detection and low working efficiency are caused since comprehensive detection of ultrasonic bulk wave, ultrasonic guided wave, surface wave and magnetic flux leakage of a detected material cannot be achieved, are solved.

In one optional embodiment, the detection sensor at least includes: the magnetic yoke, the magnetic flux leakage receiving component, the first electromagnetic acoustic coil below the pole N of the magnetic yoke and the second electromagnetic acoustic coil below the pole S of the magnetic yoke, wherein, the magnetic yoke is any one of components as follows: the permanent magnet or the electromagnet, for generating the excitation magnetic field for magnetic flux leakage detection and the bias magnetic field for electromagnetic acoustic detection.

In one optional embodiment, under the condition of the working mode of magnetic flux leakage detection, the detection sensor generates the magnetic field signal in the object to be detected through the magnetic yoke; herein, the detection module 215 may include: the detection unit, for detecting whether the magnetic field signal exists or not through the magnetic flux leakage receiving component, herein, the magnetic flux leakage receiving component is positioned in the middle of the U-shaped magnetic yoke; a first confirming unit, for confirming whether the defects exists or not according to the detection result.

In one optional embodiment, the control module 213 may include: a first acquisition unit, for, acquiring a first excitation signal for generating the ultrasonic bulk wave, herein, the first excitation signal has a first frequency; a first input unit, for inputting the first excitation signal into the first electromagnetic acoustic coil or the second electromagnetic acoustic coil; a second generating unit, for generating the ultrasonic bulk wave according to the first electromagnetic acoustic coil and the pole N of the U-shaped magnetic yoke, or the second electromagnetic acoustic coil and the pole S of the U-shaped magnetic yoke.

In one optional embodiment, the detection module 215 may include: a first receiving unit, for receiving a first echo signal reflected by the object to be detected to the ultrasonic bulk wave; a second confirming unit, for confirming whether the object to be detected has defects according to the first echo signal, and/or for confirming the thickness of the object to be detected, according to the first echo signal.

In one optional embodiment, the control module 213 may include: a second acquisition unit, for acquiring a second excitation signal for generating the ultrasonic guided wave, wherein, the second excitation signal has a second frequency; a second input unit, for inputting the second excitation signal into the first electromagnetic acoustic coil or the second electromagnetic acoustic coil; a third generating unit, for generating the ultrasonic guided wave according to the first electromagnetic acoustic coil and the pole N of the U-shaped magnetic yoke, or the second electromagnetic acoustic coil and the pole S of the U-shaped magnetic yoke.

In one optional embodiment, the detection module 215 may include: a second receiving unit, for receiving a second echo signal reflected by the object to be detected to the ultrasonic bulk wave; a third confirming unit, for confirming whether the object to be detected has defects according to the second echo signal.

In one optional embodiment, the control module 213 may include: a third acquisition unit, for acquiring a third excitation signal for generating the surface wave, herein, the third excitation signal has a third frequency; a fourth confirming unit, for inputting the third excitation signal into the first electromagnetic acoustic coil or the second electromagnetic acoustic coil; a fourth generating unit, for generating the surface wave according to the first electromagnetic acoustic coil and the pole N of the U-shaped magnetic yoke, or the second electromagnetic acoustic coil and the pole S of the U-shaped magnetic yoke.

In one optional embodiment, the detection module 215 may include: a third receiving unit for receiving a surface wave from another electromagnetic acoustic coil by means of the first electromagnetic acoustic coil, and/or the second electromagnetic acoustic coil; a fourth confirming unit is used to determine whether the object to be detected has defects according to the energy of the surface wave.

In one optional embodiment, the detection module 215 may include: a fourth receiving unit for receiving a first surface wave of the surface wave from the another electromagnetic acoustic coil by means of the first electromagnetic acoustic coil, and/or the second electromagnetic acoustic coil; a fifth receiving unit is used to receive the second surface wave transmitted from the first electromagnetic acoustic coil, and/or the second electromagnetic acoustic coil self; a fifth confirming unit is used to determine whether the object to be detected has defects according to the energy of the first and second surface wave.

The functional modules and units provided by the embodiment of the disclosure may be operated in a mobile terminal, a computer terminal or a similar computing device, and may also be used as a part of a storage medium for storage.

Therefore, the embodiments of the disclosure provide the computer terminal, the computer terminal may be any one piece of computer terminal equipment of a computer terminal group, and optionally, in the embodiment of the disclosure, the computer terminal may be replaced by terminal equipment such as a mobile terminal.

Optionally, in the embodiment, the computer terminal may be positioned in at least one network facility of multiple network facilities of a computer network.

In the embodiment, the computer terminal is capable of executing program codes of steps as follows in the method for detecting multi-mode electromagnetic acoustic and magnetic flux leakage: receiving the operation instruction for detecting the object to be detected, the operation instruction is used for controlling the detection sensor to enter into any one or more of working modes as follows: magnetic flux leakage detection, ultrasonic bulk wave detection, ultrasonic guided wave detection and surface wave detection; controlling the detection sensor to output the corresponding detection signal according to the operation instruction; detecting the object to be detected on the basis of the detection signal.

Optionally, the computer terminal may include: one or more processers, memories and transmission devices.

Herein, the memory is used for storing software programs and modules, such as program instructions modules corresponding to the method and device for detecting multi-mode electromagnetic acoustic and magnetic flux leakage of the embodiments of the disclosure, and by operating software programs and modules in the memory, by the processor, different function'applications and data processing are executed, that is, the method for detecting multi-mode electromagnetic acoustic and magnetic flux leakage is realized; the memory may include a high-speed random-access memory, further includes a nonvolatile memory such as one or more magnetic storage devices, flash memories, or other nonvolatile solid memories. In some embodiments, the memory further includes a memory for remotely setting the processor, the remote memory may be connected with a terminal through a network, and the network includes examples, but not limited, internets of companies, local area networks, mobile communication networks and combinations thereof.

The transmission device is used for receiving or transmitting data by one network. The network may include examples such as a wired network and a wireless network. In one example, the transmission device includes one Network Interface Controller (NIC), which is connected with a router through a network wire and other network equipment to communicate with the word wide Internet or the local area network.

Herein, specifically, the memory is used for storing preset action conditions and preset information of an authorized user, and applications.

The processor is capable of calling information and applications stored in the memory through the transmission device to execute program codes of steps of the methods of the above optional or preferable embodiments.

Those skilled in the art should know that the computer terminal may also be terminal equipment such as smart phones (such as an Android mobile phone and iOS mobile phone), tablet personal computers, handheld computers, mobile internet devices, MID, and PAD.

Those skilled in the art should know that: all or part of the steps of the methods of the above embodiments may be implemented by instructing related hardware through a program, the program may be stored in a computer-readable storage medium, and the storage medium includes: a flash disk, Read-Only Memory (ROM), a Random Access Memory (RAM), a magnetic disk or an optical disk.

The embodiment of the disclosure further provides a storage medium, optionally, in the embodiment, the storage medium is used for storing program codes for executing the method for detecting multi-mode electromagnetic acoustic and magnetic flux leakage provided by the above method embodiments and the above device embodiments.

Optionally, in the embodiment, the storage medium is positioned in any one computer terminal of the computer terminal group in the computer network, or in any one mobile terminal of the mobile terminal group.

Optionally, in the embodiment, the storage medium is configured to store program codes for executing the following steps: receiving the operation instruction for detecting the object to be detected, the operation instruction is used for controlling the detection sensor to enter into any one or more of working modes as follows: magnetic flux leakage detection, ultrasonic bulk wave detection, ultrasonic guided wave detection and surface wave detection; controlling the detection sensor to output the corresponding detection signal according to the operation instruction; detecting the object to be detected on the basis of the detection signal.

Optionally, in the embodiment, the storage medium is also configured to store programs for executing various preferable or optional methods provided by the method for detecting multi-mode electromagnetic acoustic and magnetic flux leakage.

The above drawings illustrate the method and device for detecting multi-mode electromagnetic acoustic and magnetic flux leakage according to the disclosure, however, Those skilled in the art should know that the method and device for detecting multi-mode electromagnetic acoustic and magnetic flux leakage provided by the disclosure may be variously improved on the basis of the disclosure, so that the protection range of the disclosure is confirmed by contents of the claims.

The sequence numbers of the foregoing embodiments of the disclosure are merely for description and do not represent the advantages and disadvantages of the embodiments.

In the foregoing embodiments of the disclosure, the description of each embodiment has its own emphasis. For the parts not described the detail in one embodiment, reference may be made to the relevant description of other embodiments.

In some embodiments provided in this application, it should be understood that the disclosed technical contents may be implemented in another manner. Among them, the equipment embodiment described above is only schematic, and for example, division of the units is only logic function division, and other division manners may be adopted during practical implementation. For example, multiple units or components may be combined or integrated into another system, or some characteristics may be neglected or not executed. Another point is that the coupling, or direct coupling or communication connection between each displayed or discussed component may be indirect coupling or communication connection, implemented through some interfaces, of the equipment or the units, and may be electrical and mechanical or adopt other forms.

The units described as separation unit may or may not be physically separated, and the unit displayed as units may not be a physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated in one processing unit, or each unit may also exist independently, and two or more unit may also be integrated into a unit. The integrated unit may be implemented in a hardware form, and may also be implemented in form of hardware and software function unit.

If implemented as software function module and sold or used as an independent product, the integrated unit of the disclosure may also be stored in a computer-readable storage medium. Based on such an understanding, the technical solutions of the invention, in essence or in parts contributing to the conventional art may be embodied in form of software product, and the computer software product is stored in a storage medium, including a plurality of instructions configured to enable a piece of computer equipment (which may be a personal computer, a server, network equipment or the like) to execute all or part of the steps of the method described in each embodiment of the disclosure. The above-mentioned storage medium includes: various media capable of storing program codes such as mobile storage equipment, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for detecting multi-mode electromagnetic acoustic and magnetic flux leakage, comprising:
receiving operation instruction for detecting an object to be detected, the operation instruction is used for controlling a detection sensor to enter one of different working modes, wherein the different working modes comprise: magnetic flux leakage detection, ultrasonic bulk wave detection, ultrasonic guided wave detection and surface wave detection;

controlling the detection sensor to output a detection signal corresponding to a entered working mode according to the operation instruction;

detecting the object to be detected on the basis of the detection signal;

wherein the detection sensor at least comprises a magnetic yoke, a magnetic flux leakage receiving component, a first electromagnetic acoustic coil below a pole N of the magnetic yoke and a second electromagnetic acoustic coil below a pole S of the magnetic yoke; the magnetic yoke is any one as follows: a permanent magnet or an electromagnet, an exciter field for detecting generating magnetic flux leakage and a bias magnetic field for electromagnetic acoustic detection;

wherein the first electromagnetic acoustic coil and the second electromagnetic acoustic coil are annular coils, and sizes of the first electromagnetic acoustic coil and the second electromagnetic acoustic coil meet equations as follows:

$$\alpha = \lambda_R \text{ and } d = (N+1/2)\lambda_R$$

where $\lambda_R$ is a surface wave length, $\alpha$ is a distance of adjacent line sources, and d is a diameter of a coil on an innermost side of coils.

2. The method as claimed in claim 1, wherein the detection sensor generates a magnetic field signal inside the object to be detected trough the magnetic yoke under a condition of a working mode of magnetic flux leakage detection; detecting the object to be detected on the basis of the detection signal comprising:

detecting, by the magnetic flux leakage receiving component, whether a leakage magnetic field signal exists outside the object to be detected or not, and the magnetic flux leakage receiving component is positioned in the middle of the magnetic yoke;

confirming whether the object to be detected has defects according to a detection result.

3. The method as claimed in claim 1, wherein controlling the detection sensor to output the corresponding detection signal according to the operation instruction under a condition of a working mode of ultrasonic bulk wave detection, comprising:

acquiring a first excitation signal for generating an ultrasonic bulk wave, the first excitation signal has a first frequency;

inputting the first excitation signal into the first electromagnetic acoustic coil or the second electromagnetic acoustic coil;

generating the ultrasonic bulk wave according to the first electromagnetic acoustic coil and the pole N of the magnetic yoke, or the second electromagnetic acoustic coil and the pole S of the magnetic yoke.

4. The method as claimed in claim 3, wherein detecting the object to be detected on the basis of the detection signal under the condition of the working mode of ultrasonic bulk wave detection, comprising:

receiving a first echo signal reflected by the object to be detected to the ultrasonic bulk wave;

confirming whether the object to be detected has defects according to the first echo signal;

and/or confirming a thickness of the object to be detected according to the first echo signal.

5. The method as claimed in claim 1, wherein controlling the detection sensor to output the corresponding detection signal according to the operation instruction under a condition of a working mode of ultrasonic guided wave detection, comprising:

acquiring a second excitation signal for generating an ultrasonic guided wave, a frequency of the second excitation signal is a second frequency;

inputting the second excitation signal into the first electromagnetic acoustic coil, or the second electromagnetic acoustic coil;

generating the ultrasonic guide wave according to the first electromagnetic acoustic coil and the pole N of the magnetic yoke, or the second electromagnetic acoustic coil or the pole S of the magnetic yoke.

6. The method as claimed in claim 5, wherein detecting the object to be detected on the basis of the detection signal under the condition of the working mode of ultrasonic guided wave detection, comprising:

receiving a second echo signal reflected by the object to be detected to the ultrasonic bulk wave;

confirming whether the object to be detected has defects according to the second echo signal.

7. The method as claimed in claim 1, wherein controlling the detection sensor to output the corresponding detection signal according to the operation instruction under a condition of a working mode of surface wave detection, comprising:

acquiring a third excitation signal for generating a surface wave, the third excitation signal has a third frequency;

inputting the third excitation signal into the first electromagnetic acoustic coil, or the second electromagnetic acoustic coil;

generating the surface wave according to the first electromagnetic acoustic coil and the pole N of the magnetic yoke, or the second electromagnetic acoustic coil and the pole S of the magnetic yoke.

8. The method as claimed in claim 7, wherein detecting the object to be detected on the basis of the detection signal under the condition of the working mode of surface wave detection, comprising:

receiving, by the first electromagnetic acoustic coil, the surface wave from the second electromagnetic acoustic coil, and/or receiving, by the second electromagnetic acoustic coil, the surface wave from the first electromagnetic acoustic coil;

confirming whether the object to be detected has defects according to energy of the surface wave.

9. The method as claimed in claim 7, wherein detecting the object to be detected on the basis of the detection signal under the condition of the working mode of surface wave detection, comprising:

receiving, by the first electromagnetic acoustic coil, and/or the second electromagnetic acoustic coil, a first surface wave of the surface wave from another electromagnetic acoustic coil;

receiving, by the first electromagnetic acoustic coil, and/or the second electromagnetic acoustic coil, a second surface wave generated from the first electromagnetic acoustic coil and/or from the second electromagnetic acoustic coil;

confirming whether the object to be detected has defects according to energy of the first surface wave and the second surface wave.

10. A multi-mode electromagnetic acoustic and magnetic flux leakage detection sensor, comprising:

a U-shaped magnetic yoke, configured to magnetize a material of an object to be detected, and generating a magnetic field signal in the object to be detected;

a magnetic flux leakage receiving component, positioned in the middle of the U-shaped magnetic yoke, and used for detecting whether a leakage magnetic field signal exists outside the object to be detected or not;

a first electromagnetic acoustic coil, positioned below a pole N of the U-shaped magnetic yoke, combined and used with a lower end of the pole N of the U-shaped magnetic yoke, and used for generating or receiving one of multiple detection waves according to an operation instruction, wherein the multiple detection waves comprise: an ultrasonic bulk wave, an ultrasonic guided wave and a surface wave;

a second electromagnetic acoustic coil, positioned below a pole S of the U-shaped magnetic yoke, combined and used with a lower end of the pole S of the U-shaped magnetic yoke, and used for generating or receiving one of the multiple detection waves according to an operation instruction, wherein the multiple detection waves comprise: an ultrasonic bulk wave, an ultrasonic guided wave and a surface wave;

wherein the first electromagnetic acoustic coil and the second electromagnetic acoustic coil are annular coils, and sizes of the first electromagnetic acoustic coil and the second electromagnetic acoustic coil meet equations as follows:

$$\alpha=\lambda_R \text{ and } d=(N+1/2)\lambda_R$$

where $\lambda_R$ is a surface wave length, $\alpha$ is a distance of adjacent line sources, and d is a diameter of a coil on an innermost side of coils.

11. The sensor as claimed in claim 10, wherein the magnetic flux leakage receiving component is a magnetic sensitive element.

12. The sensor as claimed in claim 11, wherein the magnetic sensitive element is a Hall chip.

13. The sensor as claimed in claim 10, further comprising: a magnetic flux leakage receiving component mounting base and a shell, the magnetic flux leakage receiving component mounting base is used for mounting the magnetic flux leakage receiving component; a spring is arranged between the magnetic flux leakage receiving component mounting base and the shell, so the magnetic flux leakage receiving component mounting base and the shell are in certain sliding.

14. A system for detecting multi-mode electromagnetic acoustic and magnetic flux leakage, comprising: the sensor as claimed in claim 10.

15. The system as claimed in claim 14, further comprising:
a signal generator, for generating an excitation signal for the first electromagnetic acoustic coil and the second electromagnetic acoustic coil;
a power amplifier, connected with the signal generator, and used for amplifying the excitation signal.

16. The system as claimed in claim 15, further comprising:
a duplexer, connected with the power amplifier, used for inputting the amplified excitation signal into the first electromagnetic acoustic coil and/or the second electromagnetic acoustic coil, and used for receiving an echo signal detected by the first electromagnetic acoustic coil and/or the second electromagnetic acoustic coil.

17. The system as claimed in claim 16, further comprising:
a multi-channel signal acquirer, connected with the duplexer, used for receiving any one or more of signals as follows: the echo signal detected by the first electromagnetic acoustic coil, the echo signal detected by the second electromagnetic acoustic coil, and the leakage magnetic field signal detected by the magnetic flux leakage receiving component.

18. The system as claimed in claim 17, further comprising:
a host computer, connected with the multi-channel signal acquirer, used for receiving a signal uploaded by the multi-channel signal acquirer, used for analyzing the signal, and used for confirming whether the object to be detected has defects according to an analysis result.

* * * * *